United States Patent
Zhuang et al.

(10) Patent No.: US 12,526,380 B2
(45) Date of Patent: *Jan. 13, 2026

(54) METHOD AND APPARATUS FOR CONTROLLING A PLURALITY OF VIRTUAL CHARACTERS, DEVICE, AND STORAGE MEDIUM

(71) Applicant: Tencent Technology (Shenzhen) Company Limited, Shenzhen (CN)

(72) Inventors: Yizhou Zhuang, Shenzhen (CN); Zhiyi Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/600,457

(22) Filed: Mar. 8, 2024

(65) Prior Publication Data

US 2024/0214513 A1    Jun. 27, 2024

Related U.S. Application Data

(63) Continuation of application No. 17/367,267, filed on Jul. 2, 2021, now Pat. No. 11,962,930, which is a
(Continued)

(30) Foreign Application Priority Data

Jun. 21, 2019    (CN) .......................... 201910544446.3

(51) Int. Cl.
*H04N 5/272*    (2006.01)
*G06T 19/00*    (2011.01)
(Continued)

(52) U.S. Cl.
CPC ........... *H04N 5/272* (2013.01); *G06T 19/006* (2013.01); *H04N 5/265* (2013.01); *H04N 23/62* (2023.01); *H04N 23/632* (2023.01)

(58) Field of Classification Search
CPC .. G06F 3/011; G06F 3/04815; G06F 3/04842; G06F 3/0488; G06T 19/00;
(Continued)

(56) References Cited

U.S. PATENT DOCUMENTS 8,407,606 B1 *    3/2013    Davidson .............. G06F 3/0488
                                                            345/173
8,773,468 B1      7/2014    Ballagh et al.
(Continued)

FOREIGN PATENT DOCUMENTS

CN    103080885 A    5/2013
CN    108765541 A    11/2018
(Continued)

OTHER PUBLICATIONS

Tencent Technology, European Office Action, EP Patent Application No. 20826732.8, Mar. 25, 2024, 5 pgs.
(Continued)

*Primary Examiner* — Antoinette T Spinks
(74) *Attorney, Agent, or Firm* — Morgan, Lewis & Bockius LLP

(57) ABSTRACT

This application discloses a method for controlling a plurality of virtual characters in an application. The method includes: displaying a first user interface of the application, the first user interface comprising a plurality of virtual characters; receiving a first user selection operation of at least two of the plurality of virtual characters on the first user interface; displaying a second user interface of the application, the second user interface of the application including the at least two user-selected virtual characters located in a
(Continued)

picture, the at least two virtual characters being rendered in a first sequence based on a selection order of the at least two virtual characters by the first user selection operation; receiving a second user selection operation on the second user interface; and determining a target virtual character from the at least two virtual characters according to the second user selection operation and the first rendering sequence.

17 Claims, 20 Drawing Sheets

Related U.S. Application Data continuation of application No. PCT/CN2020/096180, filed on Jun. 15, 2020.

(51) Int. Cl.
*H04N 5/265* (2006.01)
*H04N 23/62* (2023.01)
*H04N 23/63* (2023.01)

(58) Field of Classification Search
CPC ...... G06T 19/006; H04N 23/60; H04N 23/62; H04N 23/632; H04N 23/698; H04N 23/74; H04N 5/265; H04N 5/272
See application file for complete search history.

(56) References Cited

U.S. PATENT DOCUMENTS

| | | | | |
|---|---|---|---|---|
| 10,101,874 | B2* | 10/2018 | Kwon | G06F 3/0482 |
| 2012/0166988 | A1 | 6/2012 | Tsai | |
| 2014/0096084 | A1* | 4/2014 | Kwon | G06F 3/0304 |
| | | | | 715/835 |
| 2014/0108979 | A1 | 4/2014 | Davidson et al. | |
| 2016/0093108 | A1 | 3/2016 | Mao et al. | |
| 2017/0064214 | A1 | 3/2017 | Zhang et al. | |
| 2017/0109936 | A1 | 4/2017 | Powderly et al. | |
| 2018/0131878 | A1 | 5/2018 | Charlton et al. | |
| 2018/0356965 | A1* | 12/2018 | Hagiwara | G06F 3/04842 |
| 2021/0041944 | A1* | 2/2021 | Park | G06F 3/011 |
| 2021/0337138 | A1 | 10/2021 | Zhuang et al. | |
| 2024/0135660 | A1* | 4/2024 | Nakamura | G06T 3/40 |

FOREIGN PATENT DOCUMENTS

| | | |
|---|---|---|
| CN | 110276840 A | 9/2019 |
| JP | WO 2012026322 A1 | 10/2013 |
| JP | 2018534687 A | 11/2018 |
| KR | 20110105516 A | 9/2011 |
| KR | 20170027266 A | 3/2017 |
| WO | WO 2020253655 A1 | 12/2020 |

OTHER PUBLICATIONS

Tencent Technology, ISR, PCT/CN2020/096180, Sep. 16, 2020, 2 pgs.
Tencent Technology, WO, PCT/CN2020/096180, Sep. 16, 2020, 4 pgs.
Tencent Technology, IPRP, PCT/CN2020/096180, Dec. 16, 2021, 5 pgs.
Tencent Technology, Extended European Search Report, EP20826732.8, Jul. 5, 2022, 11 pgs.
Tencent Technology, Indonesian Office Action, IN Patent Application No. P00202104669, Oct. 5, 2023, 4 pgs.
Tencent Technology, Japanese Office Action, JP Patent Application No. 2021-549944, Nov. 1, 2022, 7 pgs.
Tencent Technology, Japanese Office Action, JP Patent Application No. 2021-549944, Apr. 4, 2023, 5 pgs.
Tencent Technology, Singaporean Office Action, SG Patent Application No. 11202105103Q, Sep. 13, 2022, 6 pgs.
Tencent Technology, Singaporean Office Action, SG Patent Application No. 11202105103Q, Feb. 21, 2023, 9 pgs.
Tencent Technology, European Office Action, EP Patent Application No. 20826732.8, Jun. 18, 2025, 6 pgs.

* cited by examiner

METHOD AND APPARATUS FOR CONTROLLING A PLURALITY OF VIRTUAL CHARACTERS, DEVICE, AND STORAGE MEDIUM

CROSS-REFERENCE TO RELATED APPLICATIONS

This application is a continuation application of U.S. patent application Ser. No. 17/367,267, entitled "METHOD AND APPARATUS FOR CONTROLLING A PLURALITY OF VIRTUAL CHARACTERS, DEVICE, AND STORAGE MEDIUM" filed on Jul. 2, 2021, which is a continuation application of PCT Patent Application No. PCT/CN2020/096180, entitled "METHOD AND APPARATUS FOR CONTROLLING A PLURALITY OF VIRTUAL CHARACTERS, DEVICE, AND STORAGE MEDIUM" filed on Jun. 15, 2020, which claims priority to Chinese Patent Application No. 201910544446.3, filed on Jun. 21, 2019 and entitled "METHOD AND APPARATUS FOR CONTROLLING A PLURALITY OF VIRTUAL CHARACTERS, DEVICE, AND STORAGE MEDIUM", both of which are incorporated herein by reference in their entirety.

FIELD OF THE TECHNOLOGY

Embodiments of this application relate to the field of computers, and in particular, to a method and an apparatus for controlling a plurality of virtual characters, a device, and a storage medium.

BACKGROUND OF THE DISCLOSURE

Augmented reality (AR) technology is a technology that seamlessly integrates real world information and virtual world information, and can superimpose a real environment and a virtual object on the same picture in real time.

The AR technology is applied to some applications. An AR application is provided with a virtual character, and the virtual character may be an object with a figure such as an animal or a cartoon character. The AR application may superimpose the virtual character on a real environment in real time. For example, in visual AR, a user may observe, by using a display, that the real environment surrounds the virtual character. The AR application may further implement an AR photographing technology, to photograph AR of the superimposed real environment and virtual character onto the same picture. During AR photographing, the user may perform operations such as zooming in, zooming out, and dragging on the virtual character.

However, during AR photographing, if a plurality of virtual characters are placed in AR at the same time, when there is a superimposition between the virtual characters, a clipping phenomenon occurs. Consequently, when the user performs a selection operation on the virtual character, there may be incorrect operations. For example, a first virtual character partially overlaps a second virtual character. When the user clicks on an overlapping part to select the first virtual character, the second virtual character may be selected finally, making human-computer interaction more difficult.

SUMMARY

Embodiments of this application provide a method and an apparatus for controlling a plurality of virtual characters, a device, and a storage medium. In a scenario of AR photographing of a plurality of virtual characters, a user can accurately select a target virtual character. The technical solutions are as follows:

According to an aspect of this application, a method for controlling a plurality of virtual characters is provided, the method being applicable to a terminal, an application with an AR function running in the terminal, the method including:

displaying a first user interface of the application, the first user interface comprising a plurality of virtual characters for user selection;

receiving a first user selection operation on at least two virtual characters on the first user interface;

displaying a second user interface of the application, the second user interface of the application including a background picture of a real world and the at least two user-selected virtual characters located in the background picture, the at least two virtual characters being rendered after a rendering sequence of the at least two virtual characters is determined according to depth information of the at least two virtual characters based on a selection order of the at least two virtual characters by the first selection operation;

receiving a second user selection operation on the second user interface; and determining a target virtual character from the at least two virtual characters according to the second user selection operation and the rendering sequence.

According to another aspect of this application, an apparatus for controlling a plurality of virtual characters is provided, an application with an AR function running in the apparatus, the apparatus including:

a display module, configured to display a first user interface of the application, the first user interface comprising a plurality of virtual characters for user selection;

a receiving module, configured to receive a first user selection operation on at least two virtual characters on the first user interface;

the display module being configured to display a second user interface of the application, the second user interface of the application including a background picture of a real world and the at least two user-selected virtual characters located in the background picture, the at least two virtual characters being rendered after a rendering sequence of the at least two virtual characters is determined according to depth information of the at least two virtual characters based on a selection order of the at least two virtual characters by the first selection operation;

the receiving module being configured to receive a second user selection operation on the second user interface; and a determining module, configured to determine a target virtual character from the at least two virtual characters according to the second user selection operation and the rendering sequence.

According to another aspect of this application, a computer device (e.g., a terminal) is provided, including:

a memory; and a processor electrically connected to the memory, the processor being configured to load and execute executable instructions to implement the method for controlling a plurality of virtual characters according to the foregoing one aspect.

According to another aspect of this application, a non-transitory computer-readable storage medium is provided, storing computer-executable instructions of an application with an augmented reality (AR) function, the computer-executable instructions being loaded and executed by a processor of a terminal to implement the method for controlling a plurality of virtual characters according to the foregoing one aspect.

The technical solutions provided in the embodiments of this application achieve at least the following beneficial effects:

A rendering sequence is determined by using depth information, and at least two virtual characters are drawn according to the rendering sequence, so that a clipping phenomenon can be avoided when the virtual characters are superimposed, to enable a user to accurately determine a target virtual character when performing a selection operation on the virtual characters. The user can perform a control operation on a three-dimensional model like a two-dimensional picture in an AR scenario, to ensure consistency between touch determination and vision, thereby resolving a problem of human-computer interaction for a three-dimensional virtual character. For example, when a first virtual character overlaps with a second virtual character, and the first virtual character precedes the second virtual character in a rendering sequence, the terminal can accurately determine the first virtual character as the target virtual character according to a selection operation.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make objectives, technical solutions, and advantages of the embodiments of this application clearer, the following further describes in detail implementations of this application with reference to the accompanying drawings.

First, terms included in this application are explained.

AR technology is a technology that seamlessly integrates real world information and virtual world information, and can superimpose a real environment and a virtual object on the same picture in real time.

In the embodiments provided in this application, an application provides a three-dimensional virtual environment when running on a terminal by using the AR technology. The three-dimensional virtual environment includes a real environment captured by a camera and a virtual object and a virtual character generated by computer simulation.

A virtual character is a movable object in the foregoing three-dimensional virtual environment. The movable object may be at least one of a virtual person, a virtual animal, and a cartoon person. In some embodiments, the virtual character is a three-dimensional model created based on a skeletal animation technology. Each virtual role has a respective shape and size in the three-dimensional virtual environment, and occupies some space in the three-dimensional virtual environment.

Figure 1:
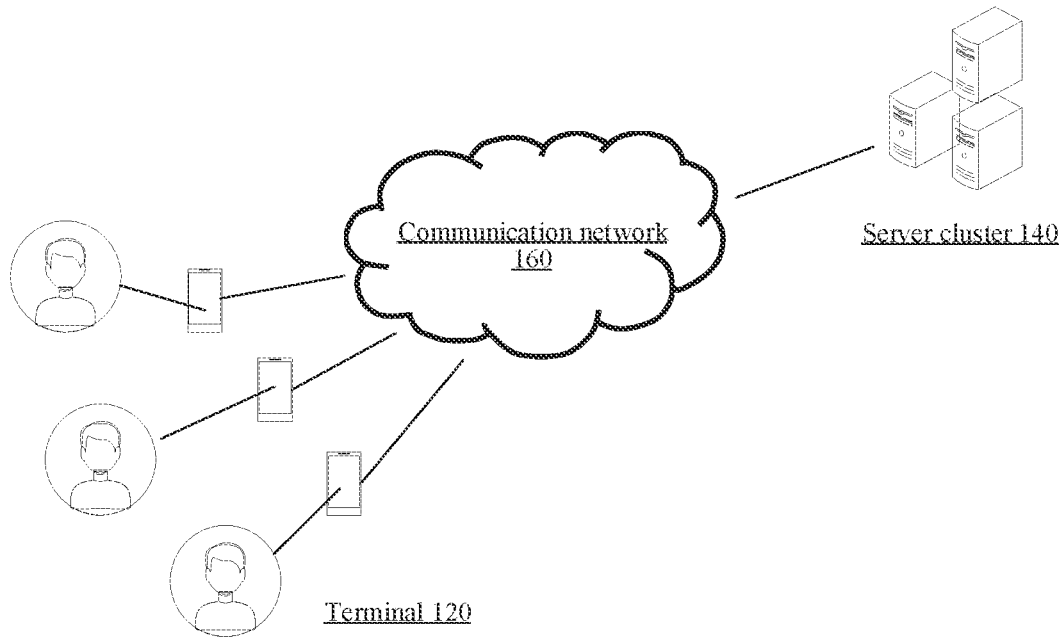
FIG. 1 is a schematic diagram of an implementation environment of a method for controlling a plurality of virtual characters according to an exemplary embodiment of this application.

FIG. 1 is a schematic diagram of an implementation environment of a method for controlling a plurality of virtual characters according to an exemplary embodiment of this application. The implementation environment includes a terminal 120, a server cluster 140, and a communication network 160.

The terminal 120 is connected to the server cluster 140 through the communication network 160. An application with an AR function is installed and runs in the terminal 120, and the application is further provided with a function of supporting a virtual character. In some embodiments, the application may be any one of an AR game program, an AR education program, and an AR navigation program.

In some embodiments, an application with an information sharing channel is further installed and runs in the terminal 120, and a first account or a second account is logged in to the application.

In some embodiments, the terminal 120 may be at least one of a smartphone, a game console, a desktop computer, a tablet computer, an e-book reader, a Moving Picture Experts Group Audio Layer III (MP3) player, an MPEG-4 (MP4) player, and a laptop portable computer.

The server cluster 140 includes at least one of one server, a plurality of servers, a cloud computing platform, and a virtualization center. The server cluster 140 is configured to provide a background service to the application with the AR function. In some embodiments, the server cluster 140 takes on primary computing work, and the terminal 120 takes on secondary computing work; alternatively, the server cluster 140 takes on secondary computing work, and the terminal 120 takes on primary computing work; alternatively, collaborative computing is performed by using a distributed computing architecture between the server cluster 140 and the terminal 120.

In some embodiments, the server cluster 140 includes an access server and a backend server. The access server is configured to provide an access service and an information receiving/transmitting service for the terminal 120, and forward valid information between the terminal 120 and the backend server. The backend server is configured to provide the backend service for the application, for example, at least one of a game logic service, a material providing service, a virtual character generating service, a three-dimensional figure generating service of a virtual character, a two-dimensional image conversion and storage service of a virtual character, a virtual character trading service, and a virtual character display service. There may be one or more backend servers. When there are a plurality of backend servers, there are at least two backend servers configured to provide different services, and/or there are at least two backend servers configured to provide the same service. This is not limited in this embodiment of this application.

The communication network 160 may be a wired network and/or a wireless network. The wired network may be a metropolitan area network, a local area network, a fiber optic network, or the like; and the wireless network may be a mobile communication network or a Wireless Fidelity (Wi-Fi) network.

The method for controlling a plurality of virtual characters provided in this embodiment of this application is applicable to the foregoing implementation environment, and supports the following application scenarios:

The method for controlling a plurality of virtual characters is applicable to an AR game program. A plurality of virtual characters are displayed on a user interface by using the AR game program; a selection operation triggered on the user interface is received; a physical ray is emitted from a trigger position of the selection operation, and a virtual character that collides with the physical ray is determined as a target virtual character; and the target virtual character is controlled through a control operation. For example, a position of the virtual character in the three-dimensional virtual environment is controlled, or the virtual character is controlled to make continuous actions.

The method for controlling a plurality of virtual characters is applicable to an AR education program. A plurality of virtual characters are displayed and controlled on a user interface by using the AR education program. For example, the AR education program is used to simulate a chemical experiment, and display experimental apparatuses and medicines on the user interface; a selection operation triggered on the user interface is received; a physical ray is emitted from a trigger position of the selection operation, and an experimental apparatus (medicine) that collides with the physical ray is determined as a target apparatus (medicine); and control operations are performed to implement placement of the target apparatus, assembly of experimental apparatuses, and addition, measurement, and weighing of medicines.

The method for controlling a plurality of virtual roles is applicable to an AR military simulation program. A plurality of virtual roles are displayed and controlled on a user interface by using the AR military simulation program. For example, the AR military simulation program is used for military layout, to display a plurality of outposts on the user interface; a selection operation triggered on the user interface is received; a physical ray is emitted from a trigger position of the selection operation, and an outpost that collides with the physical ray is determined as a target outpost; and the target outpost is placed to a reasonable position through a drag operation, and a cordon is built.

The method for controlling a plurality of virtual characters is applicable to an AR construction program. A plurality of types of buildings such as houses, shops, garages, traffic lights, and viaducts are displayed on a user interface by using the AR construction program; a selection operation triggered on the user interface is received; a physical ray is emitted from a trigger position of the selection operation, and a building that collides with the physical ray is determined as a target building; and a geographic location of the target building or a display angle of the target building is set through a control operation.

The foregoing application scenarios are merely used as examples to illustrate the application scenarios of the method for controlling a plurality of virtual characters provided in this application, but this application is not limited to the foregoing application scenarios.

Figure 2:
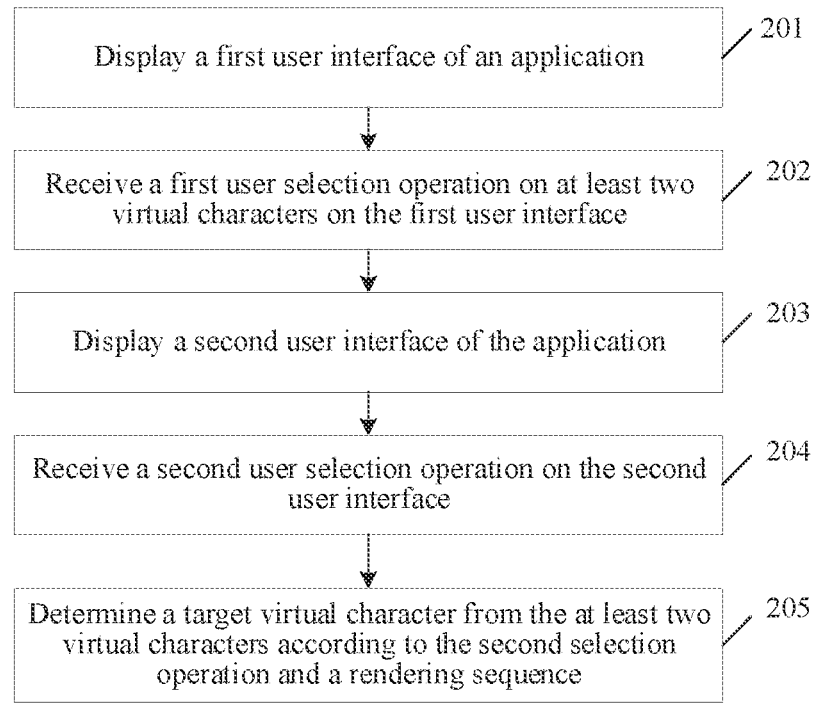
FIG. 2 is a flowchart of a method for controlling a plurality of virtual characters according to an exemplary embodiment of this application.

FIG. 2 is a flowchart of a method for controlling a plurality of virtual characters according to an exemplary embodiment of this application. This embodiment is described by using an example in which the method is applied to the implementation environment shown in FIG. 1. The method includes the following steps:

Step 201. Display a first user interface of an application.

An application with an AR function runs in a terminal, and the application is provided with a function of supporting a virtual character. A first user interface of the application is displayed on the terminal, the first user interface including selection items of a plurality of virtual characters.

In some embodiments, the application includes at least one of an AR game program, an AR education program, an AR military simulation program, an AR construction program, and an AR navigation program.

In some embodiments, the displaying the first user interface of the application on the terminal may include the following schematic steps:

> displaying a second user interface of the application on the terminal, the second user interface including a list item control, the list item control being a control configured to trigger the display of the selection items of the plurality of virtual characters;
>
> receiving, by the terminal, a trigger operation on the list item control; and
>
> displaying the first user interface of the application according to the trigger operation, the first user interface including the selection items of the plurality of virtual characters, a background picture of a real world being displayed on an AR photographing interface.

That is, after performing step 203 in this embodiment, the terminal displays the first user interface by triggering the list item control on the second user interface when reselecting a virtual character or choosing to add a virtual character.

Alternatively, the displaying the first user interface of the application on the terminal may further include the following schematic steps:

> displaying an AR homepage of the application on the terminal, the AR homepage including a display control, the display control being a control configured to trigger the display of the selection items of the plurality of virtual characters;
>
> receiving, by the terminal, a trigger operation on the display control; and
>
> displaying the first user interface of the application according to the trigger operation, the first user interface including the selection items of the plurality of virtual characters, a background picture of a real world being displayed on the AR homepage.

In some embodiments, the trigger operation includes at least one of a single-click/tap operation, a multiple-click/tap operation, a long-press operation, a swipe operation, a drag operation, and a combination thereof.

Figure 3:
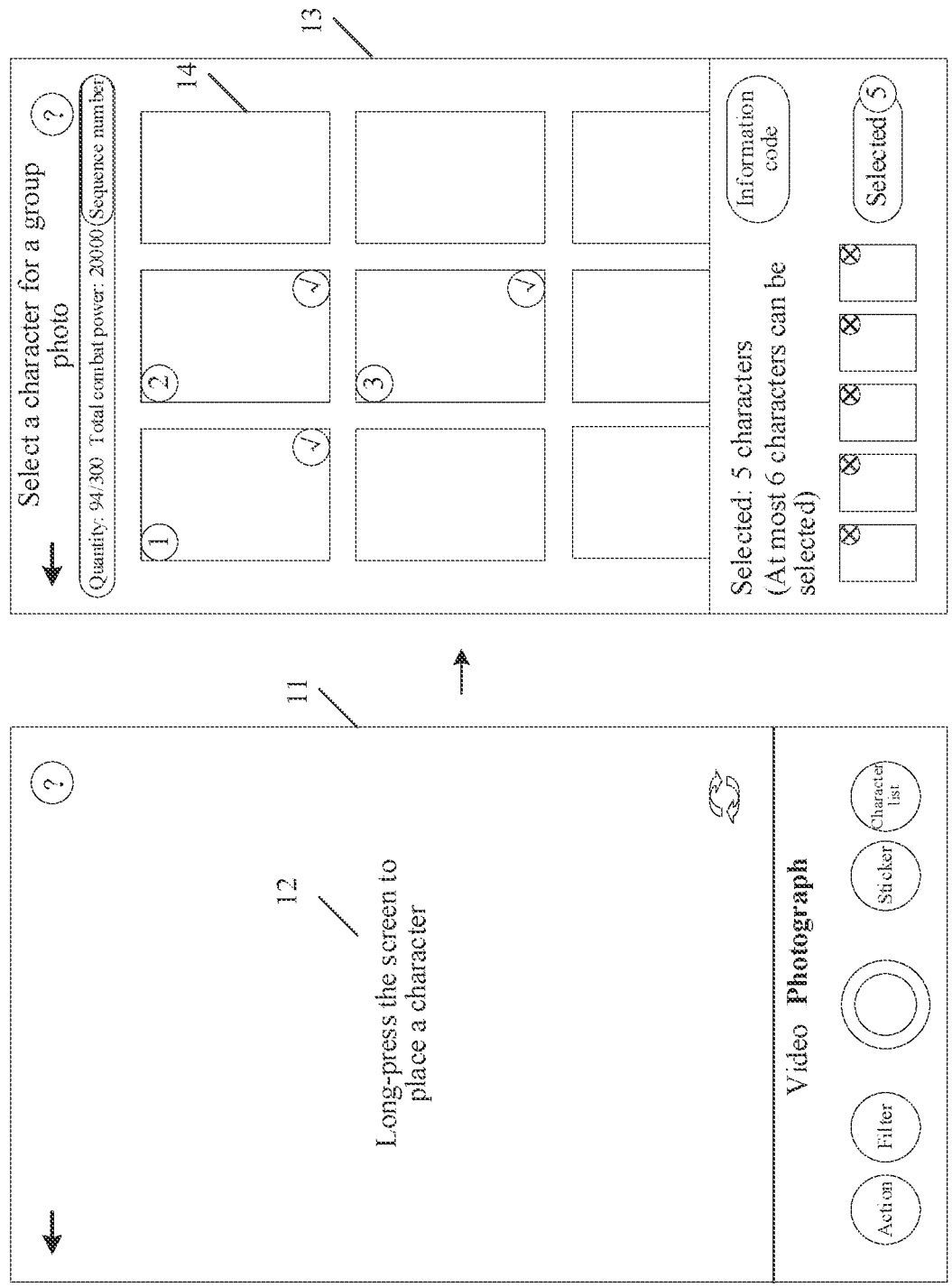
FIG. 3 is a schematic diagram of an interface for implementing a method for controlling a plurality of virtual characters according to an exemplary embodiment of this application.

Schematically, as shown in FIG. 3, an AR homepage 11 of an AR application is displayed on the terminal, the AR homepage 11 including a display control 12; the terminal receives a long-press operation on the display control 12; and a first user interface 13 is displayed on the terminal, selection items 14 of a plurality of virtual characters being displayed on the first user interface 13.

Step 202. Receive a first user selection operation on at least two virtual characters on the first user interface.

The terminal receives the first selection operation on the at least two virtual characters on the first user interface. In some embodiments, the first selection operation includes at least one of a single-click/tap operation, a multiple-click/tap operation, a swipe operation, a drag operation, a long-press operation, and a combination thereof.

Step 203. Display a second user interface of the application.

A background picture of a real world and the at least two virtual characters located in the background picture are displayed on the second user interface, the at least two virtual characters are obtained through rendering after a rendering sequence of the at least two virtual characters is determined according to depth information of the at least two virtual characters based on a selection order of the at least two virtual characters by the first selection operation.

In some embodiments, depth information of a virtual character includes a depth of field of the virtual character. The depth of field is a longitudinal range distance of a photographed object measured in front of a camera lens or another imager, and the photographed object can be clearly imaged within the distance.

In some embodiments, the displaying the second user interface of the application on the terminal may include the following schematic steps:

> setting the depth information of the at least two virtual characters according to a selection sequence of the at least two virtual characters according to the first selection operation;
>
> determining the rendering sequence of the at least two virtual characters according to the depth information; and
>
> rendering the at least two virtual characters according to the rendering sequence, and displaying the at least two virtual characters on the second user interface.

The rendering is coloring a model of a virtual character following a principle of a real camera. In this embodiment, the terminal renders the model of the virtual character to make the virtual character present a three-dimensional effect in a three-dimensional virtual environment. The rendering sequence is a sequence of rendering models of the at least two virtual characters.

Figure 4:
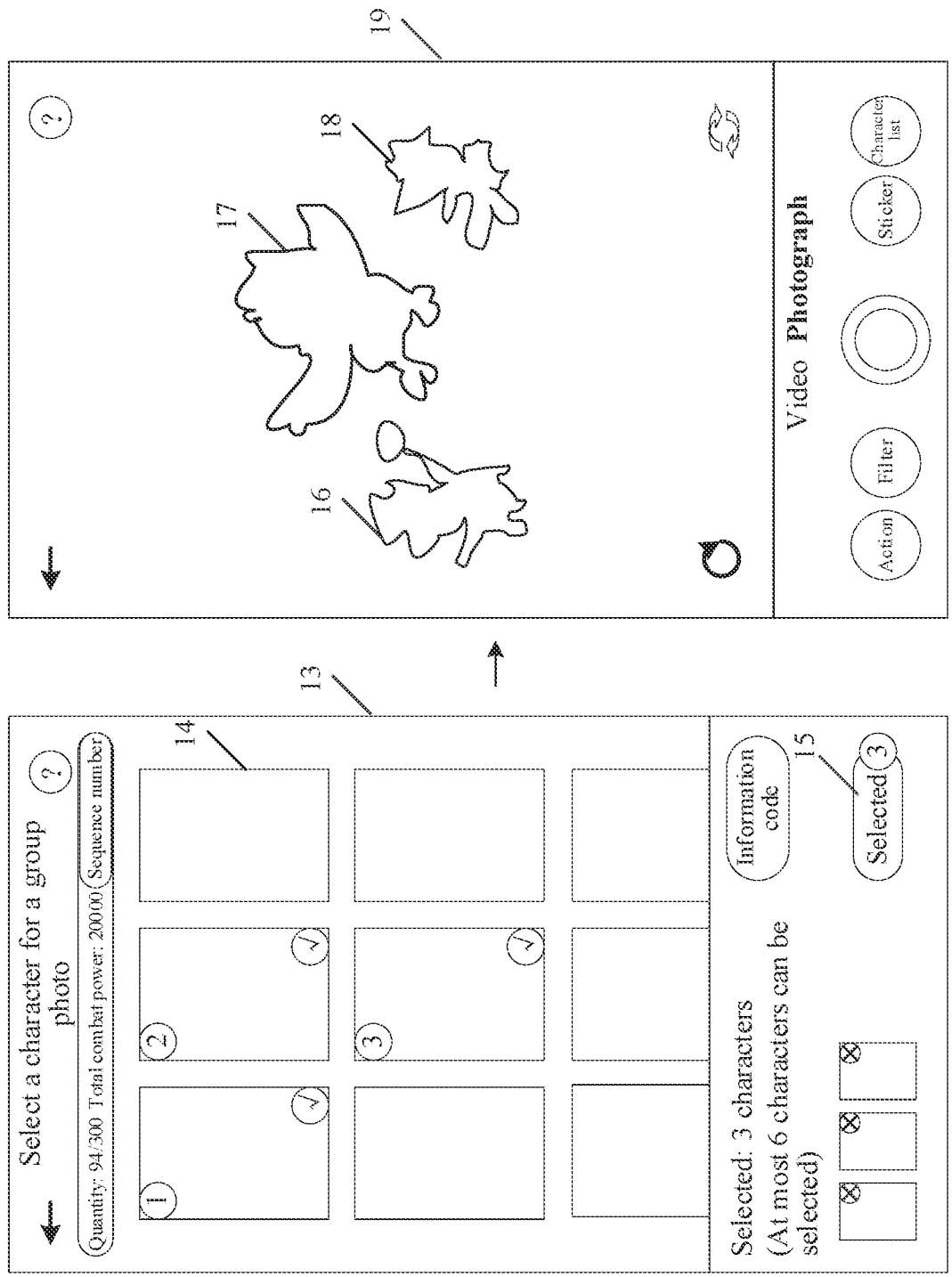
FIG. 4 is a schematic diagram of an interface for implementing a method for controlling a plurality of virtual characters according to another exemplary embodiment of this application.

Schematically, as shown in FIG. 4, a selection item 1, a selection item 2, and a selection item 3 are sequentially selected on a first user interface 13 by single-clicking/tapping; an OK button control 15 is then clicked/tapped to determine to display three virtual characters corresponding to the selection item 1, the selection item 2, and the selection item 3; and a virtual character 16, a virtual character 17, and a virtual character 18 are displayed on a second user interface 19. A drawing sequence of the foregoing three virtual characters is determined according to the depth information. The depth information is determined according to the first selection operation. For example, the selection item 1 corresponds to the virtual character 17, and the selection item 2 corresponds to the virtual character 18. According to a sequence of selecting the selection item 1 and then selecting the selection item 2, depth information of the virtual character 17 is set to 6, and depth information of the virtual character 18 is set to infinity. The rendering sequence is rendering the virtual character 17 and then rendering the virtual character 18. In FIG. 4, the virtual character 17 is visually closer to the front than the virtual character 18 on the second user interface.

Figure 5:
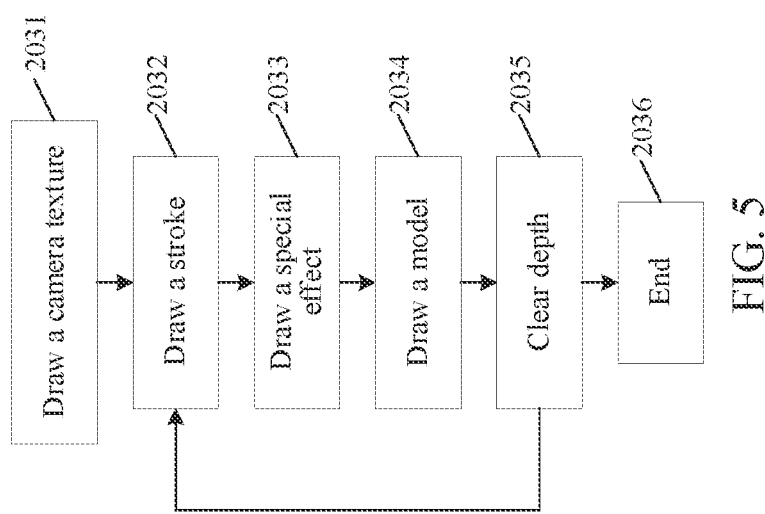
FIG. 5 is a flowchart of a pixel processing method for a virtual character according to an exemplary embodiment of this application.

As shown in FIG. 5, a process of drawing each pixel of a virtual character on a terminal is as follows:

2031. Draw a camera texture.

The terminal draws the camera texture corresponding to the virtual character on the pixel. The camera texture is grooves and/or patterns on the surface of an object captured by a camera, and the camera is a camera model when a user views a virtual world.

2032. Draw a stroke.

Stroke is making edge lines. In the process shown in FIG. 5, when the pixel is an effective pixel, the terminal draws a stroke of the pixel. The effective pixel is that the pixel is located on an edge of an image of the virtual character.

2033. Draw a special effect.

The special effect is, for example, that the color of the clothes of the virtual character keeps changing, or the hemline of a skirt of the virtual character keeps fluttering.

When the pixel includes a special effect, the terminal draws the special effect on the pixel.

2034. Draw a model.

The model is a structure that describes a morphological structure of an object. The terminal draws the model on the pixel.

2035. Clear depth.

Depth information of the current pixel is cleared, and the process returns to step 2032 to draw a next pixel. When the drawing of the virtual character is completed, step 2036 is performed.

2036. End.

Step 204. Receive a second user selection operation on the second user interface.

The terminal receives the second user selection operation on the virtual character on the second user interface. In some embodiments, the second user selection operation includes at least one of a single-click/tap operation, a multiple-click/tap operation, and a long-press operation.

Step 205. Determine a target virtual character from the at least two virtual characters according to the second user selection operation and a rendering sequence.

When the virtual characters do not overlap, the terminal determines a virtual character correspondingly selected by the second user selection operation as the target virtual character.

Figure 6:
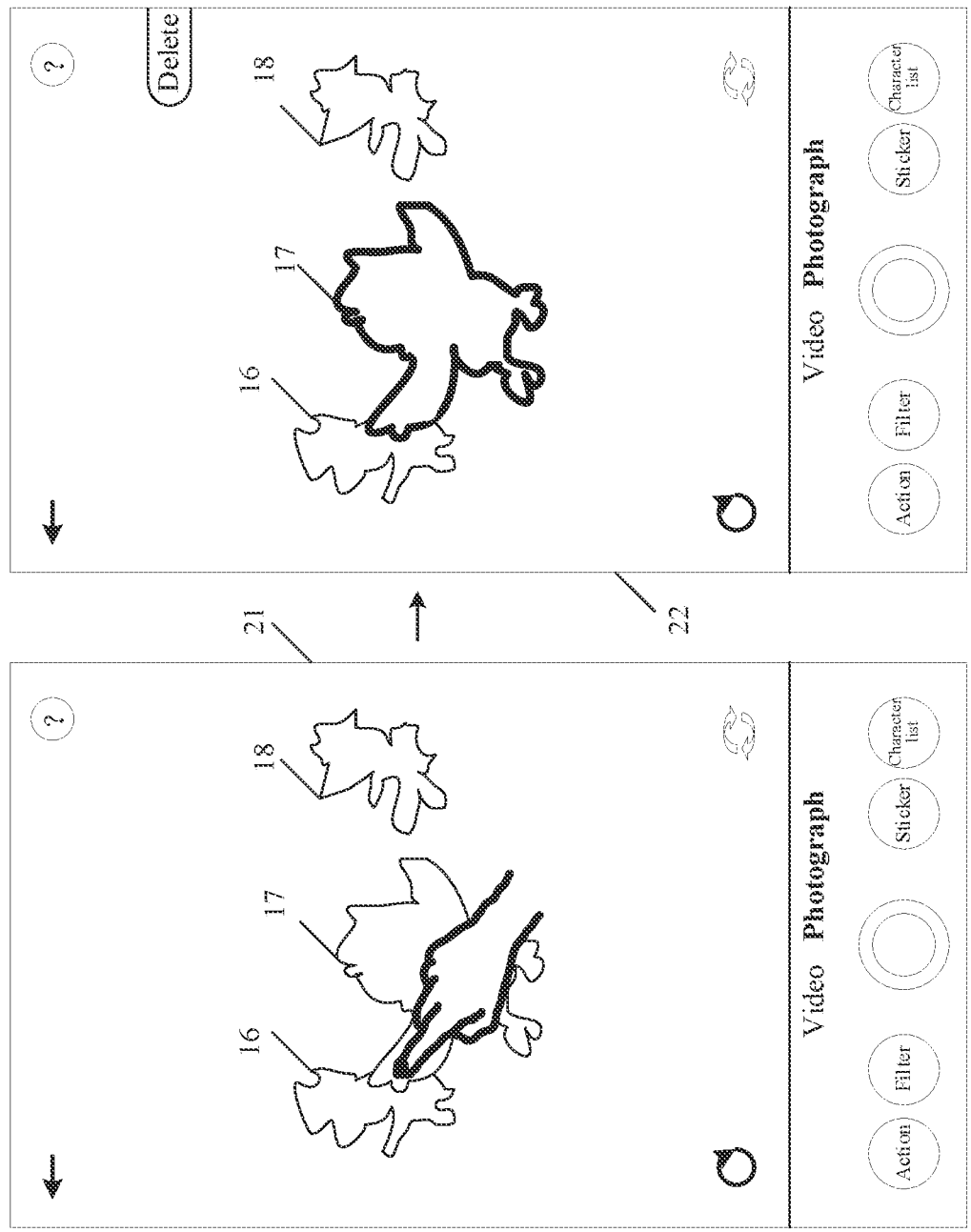
FIG. 6 is a schematic diagram of an interface for implementing a method for controlling a plurality of virtual characters according to another exemplary embodiment of this application.

In some embodiments, the terminal emits a physical ray from a trigger position of the second user selection operation, and determines a virtual character that collides with the physical ray as the target virtual character. For example, as shown in FIG. 6, when the trigger position according to the second user selection operation is located in an area in which the virtual character 18 is located, the physical ray emitted from the trigger position collides with the virtual character 18, and the virtual character 18 is determined as the target virtual character.

The terminal determines a virtual character to be rendered first in the rendering sequence as the target virtual character according to the second user selection operation when the at least two virtual characters overlap.

In some embodiments, when the at least two virtual characters overlap, the schematic steps for the terminal to determine the target virtual character are as follows:

1) The terminal emits a physical ray from a trigger position of the second user selection operation in a three-dimensional virtual environment in which the virtual character is located.

2) The terminal determines a virtual character that collides with the physical ray according to the rendering sequence as the target virtual character.

The collision of the physical ray and the virtual character is the collision of elements of the physical ray and elements of the virtual character. The terminal determines the collision between the physical ray and the virtual character through collision detection. The physical ray collides with the virtual character to be rendered first in the rendering sequence.

For example, as shown in FIG. 6, the virtual character 16 and the virtual character 17 partially overlap, and the rendering sequence is that the virtual character 17 is to be rendered before the virtual character 16. When the trigger position of the second user selection operation is located in an overlapped area, the physical ray emitted from the trigger position by the terminal collides with the virtual character 17, and the virtual character 17 is determined as the target virtual character.

Based on the above, according to the method for controlling a plurality of virtual characters provided in this embodiment, when the application with the AR function runs on the terminal, a rendering sequence is determined by using depth information, and at least two virtual characters are drawn according to the rendering sequence, so that a clipping phenomenon can be avoided when the virtual characters are superimposed, to enable a user to accurately determine a target virtual character when performing a selection operation on the virtual characters. The user can perform a control operation on a three-dimensional model like a two-dimensional picture in an AR scenario, to ensure consistency between touch determination and vision, thereby resolving a problem of human-computer interaction for a three-dimensional virtual character. For example, when a first virtual character overlaps with a second virtual character, and the first virtual character precedes the second virtual character in a rendering sequence, the terminal can accurately determine the first virtual character as the target virtual character according to a selection operation.

In this embodiment, the user interface displayed on the terminal is a two-dimensional image. For example, the first user interface and the second user interface are both two-dimensional images.

Figure 7:
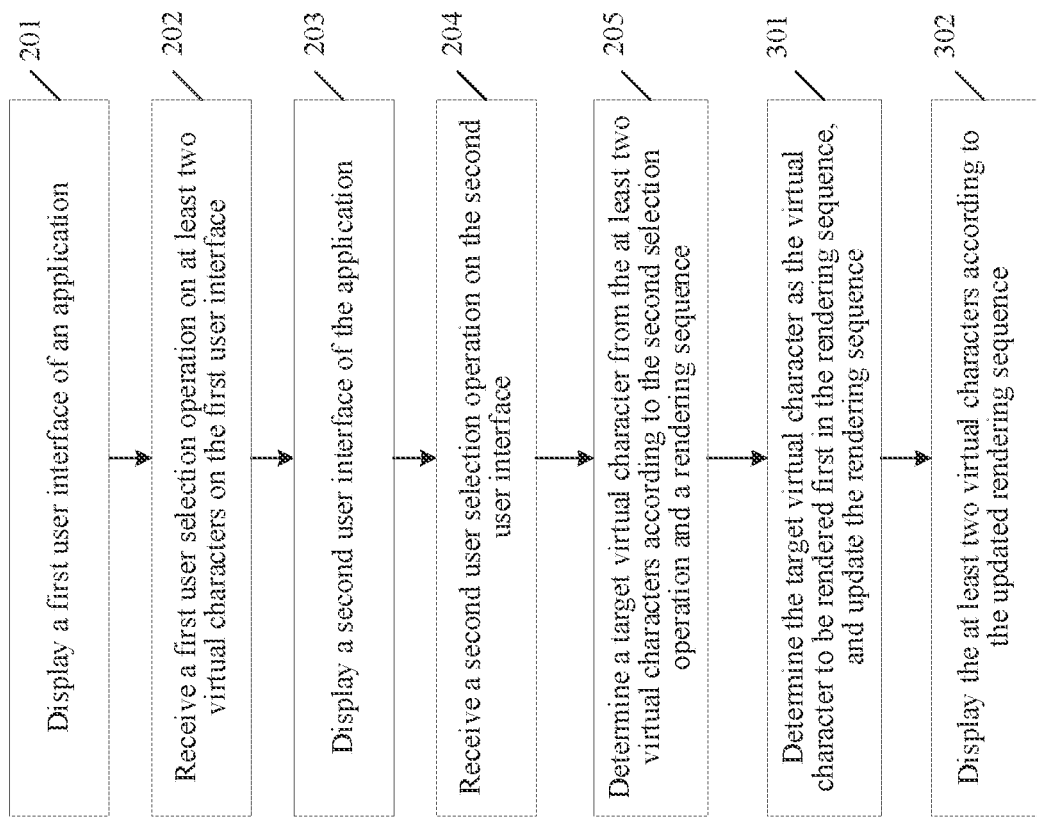
FIG. 7 is a flowchart of a method for controlling a plurality of virtual characters according to another exemplary embodiment of this application.

Based on FIG. 2, steps 301 and 302 are added after step 205, and the terminal updates the second user interface after determining the target virtual character. As shown in FIG. 7, the schematic steps are as follows:

Step 301. Determine the target virtual character as the virtual character to be rendered first in the rendering sequence, and update the rendering sequence.

Based on the original rendering sequence, the terminal sets that the target virtual character is to be rendered first, and keeps the rendering sequence of the remaining virtual characters unchanged, to update the rendering sequence.

For example, the rendering sequence of the virtual character 16, the virtual character 17, and the virtual character 18 is: the virtual character 16, the virtual character 17, and the virtual character 18; and when the terminal determines the virtual character 17 as the target virtual character, the rendering sequence is updated to: the virtual character 17, the virtual character 16, and the virtual character 18.

Step 302. Display the at least two virtual characters according to the updated rendering sequence.

Figure 8:
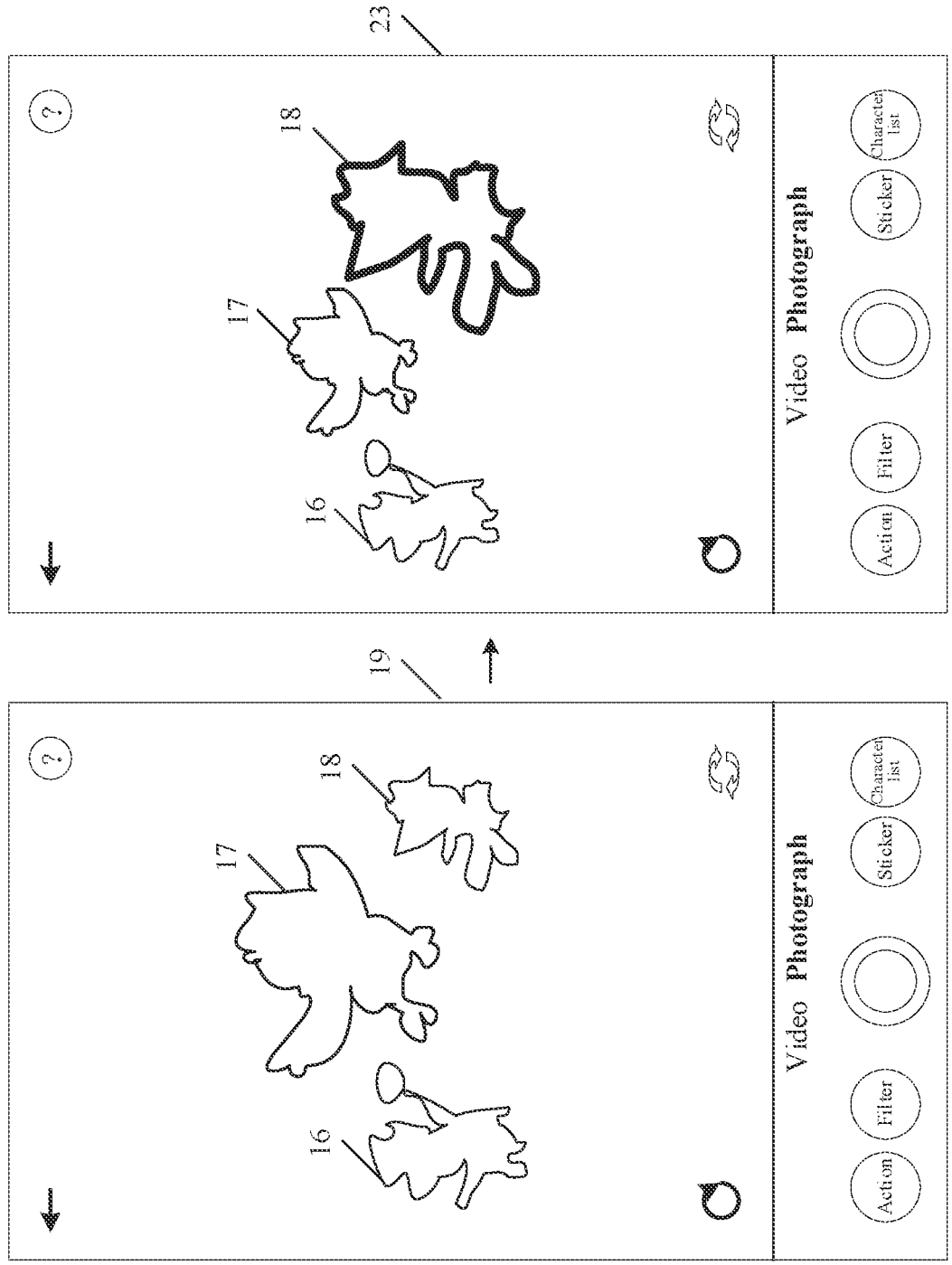
FIG. 8 is a schematic diagram of an interface for implementing a method for controlling a plurality of virtual characters according to another exemplary embodiment of this application.

The terminal re-draws and display the at least two virtual characters according to the updated rendering sequence. Schematically, as shown in FIG. 8, the rendering sequence of the three virtual characters on the second user interface 19 is: the virtual character 17, the virtual character 16, and the virtual character 18. After the terminal determines the virtual character 18 as the target virtual character, the rendering sequence is updated to: the virtual character 18, the virtual character 17, and the virtual character 16. On the second user interface 23, the three virtual characters are displayed according to the updated rendering sequence. Visually, the virtual character 18 is apparently close to the front than the virtual character 16 and virtual character 17.

Figure 9:
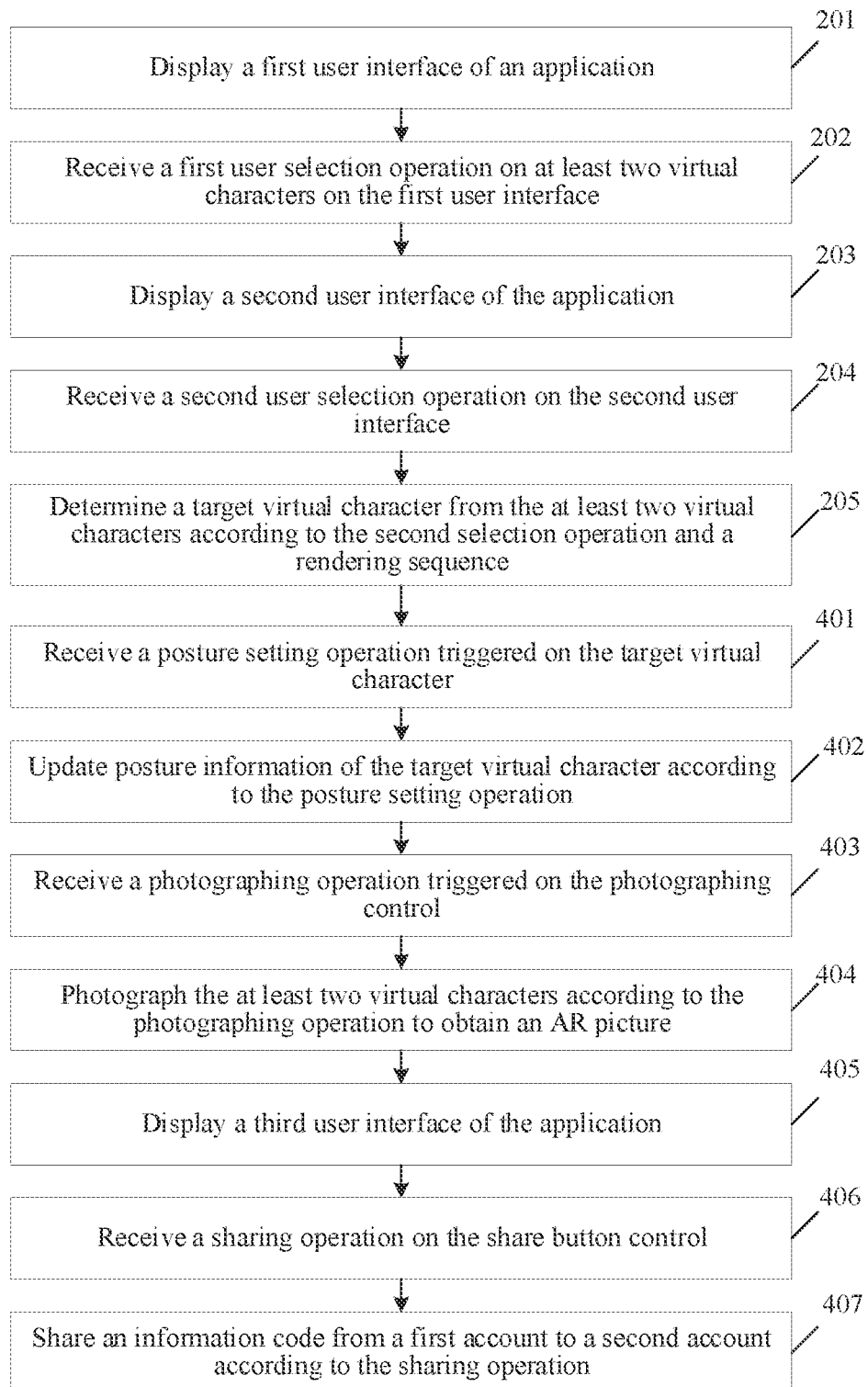
FIG. 9 is a flowchart of a method for controlling a plurality of virtual characters according to another exemplary embodiment of this application.

In some embodiments, the second user interface is a photographing interface. Based on FIG. 2, steps 401 to 407 are added after step 205, and the terminal implements a photographing function and a photograph sharing function of a plurality of virtual characters. As shown in FIG. 9, the schematic steps as follows:

Step 401. Receive a posture setting operation triggered on the target virtual character.

The posture setting operation is used for setting posture information of the target virtual character. In some embodiments, the posture information includes at least one of location information, action information, and size information of the virtual character. In some embodiments, the location information includes geographic location information of the target virtual character in the three-dimensional virtual environment and rotation information of the target virtual character.

In some embodiments, the posture setting operation includes at least one of a swipe operation, a single-click/tap operation, a multiple-click/tap operation, a drag operation, and a zoom operation.

Schematically, the receiving the posture setting operation triggered on the target virtual character on the terminal may include the following schematic steps:
  receiving a swipe operation on the target virtual character, the swipe operation being used for setting the position information of the target virtual character in the three-dimensional virtual environment; or
  receiving a drag operation on the target virtual character, the drag operation being used for setting the position information of the target virtual character in the three-dimensional virtual environment; or
  receiving a zoom operation on the target virtual character, the zoom operation being used for setting the size information of the target virtual character; or
  playing continuous actions of the target virtual character; and
  receiving a single-click/tap operation on the second user interface, the single-click/tap operation being used for freezing an action of the target virtual character, the freezing action being used for setting the action information of the target virtual character.

Step 402. Update posture information of the target virtual character according to the posture setting operation.

In some embodiments, the terminal rotates a display angle of the target virtual character according to the posture setting operation. For example, the terminal rotates and adjusts the display angle of the target virtual character according to a swipe operation in the transverse direction.

Alternatively, the terminal sets the geographic location of the target virtual character in the three-dimensional virtual environment according to the posture setting operation. For example, the terminal moves the target virtual character vertically on the second user interface according to a drag operation in the vertical direction.

Alternatively, the terminal sets the size information of the target virtual character according to the posture setting operation. For example, the terminal sets the size of the target virtual object according to a zoom operation.

Alternatively, the terminal sets the action information of the target virtual character according to the posture setting operation. For example, the terminal plays the continuous actions of the target virtual character, and freezes the action of the target virtual character according to a single-click/tap operation.

Step 403. Receive a photographing operation triggered on the photographing control.

The second user interface includes a photographing control; and the terminal receives the photographing operation triggered on the photographing control. The photographing operation is used for photographing the at least two virtual characters after the posture information is set, or used for photographing with the at least two virtual characters after the posture information is set.

Step 404. Photograph the at least two virtual characters according to the photographing operation to obtain an AR picture.

The terminal photographs the at least two virtual characters according to the photographing operation to obtain an AR picture, the AR picture including the target virtual character displayed with setting of the posture information. In some embodiments, the AR picture further includes an object in a real environment. For example, the object in the real environment may be a real object, a real animal, or a real human.

Figure 10:
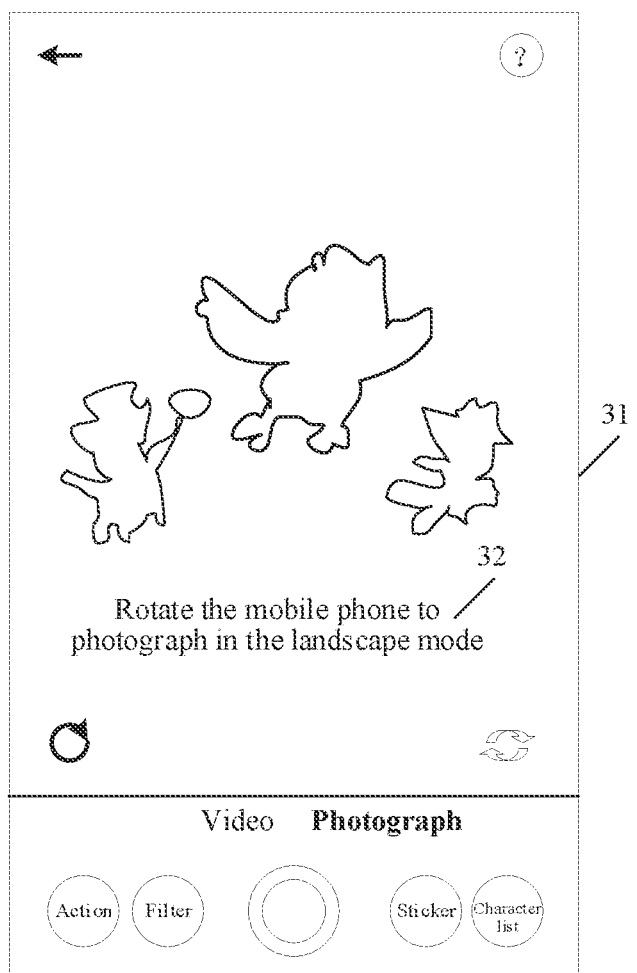
FIG. 10 is a schematic diagram of an interface for implementing a method for controlling a plurality of virtual characters according to another exemplary embodiment of this application.

In some embodiments, when the at least two virtual characters are photographed in the application for the first time, the terminal prompts that the photographing may be performed in the landscape mode. Schematically, as shown in FIG. 10, a prompt 32 is displayed on a user interface 31: "Rotate the mobile phone to photograph in the landscape mode." In this case, when the landscape mode of the mobile phone is locked, the terminal prompts to unlock the mobile phone screen. For example, a prompt "Please unlock the screen first" is displayed on the user interface.

Step 405. Display a third user interface of the application.

The terminal displays the AR picture on the third user interface of the application, the third user interface further including a share button control. The share button control is configured to share at least one of the AR picture and the posture information of the at least two virtual characters in the AR picture.

Step 406. Receive a sharing operation on the share button control.

The terminal receives the sharing operation on the share button control. For example, the sharing operation may be a single-click/tap operation.

Step 407. Share an information code from a first account to a second account according to the sharing operation.

The information code includes the posture information of the at least two virtual characters in the AR picture, and the information code is used for setting postures of the at least two virtual characters.

The schematic steps of the terminal sharing an information code from a first account to a second account according to the sharing operation are as follows:

1) Obtain the posture information of the at least two virtual characters according to the sharing operation, to generate the information code.

In some embodiments, the terminal maps the geographic location information to a grid (grid layout) for encoding. For example, the terminal converts 16 floating-point numbers representing the geographic location information into two integers with known upper limits, and the upper limits are determined according to the display size of the terminal screen.

In some embodiments, the terminal maps a Euler angle representing the rotation information into a two-dimensional plane, and encodes, through a hash function, a hash value obtained after the Euler angle is mapped. For example, the terminal represents the Euler angle by using an angle value in a range of 0 degrees to 360 degrees, and calculates the angle value through a hash function to obtain a hash value.

In some embodiments, the terminal reduces the accuracy of the size information, and encodes the size information whose accuracy is reduced.

Figure 11:
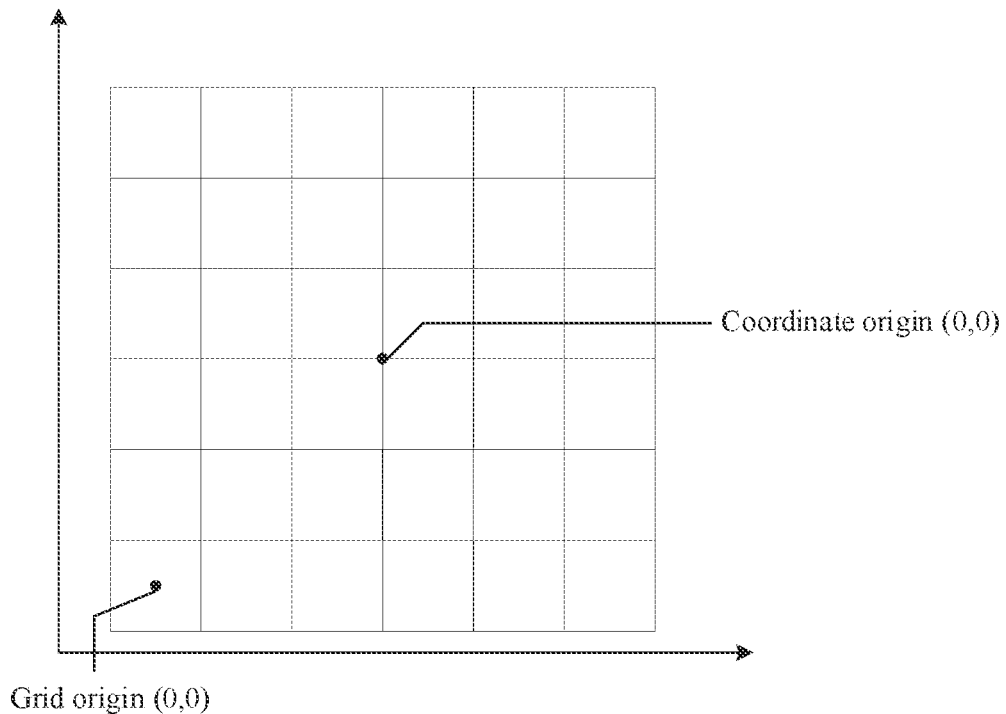
FIG. 11 is a schematic diagram of a grid according to an exemplary embodiment of this application.
Figure 12:
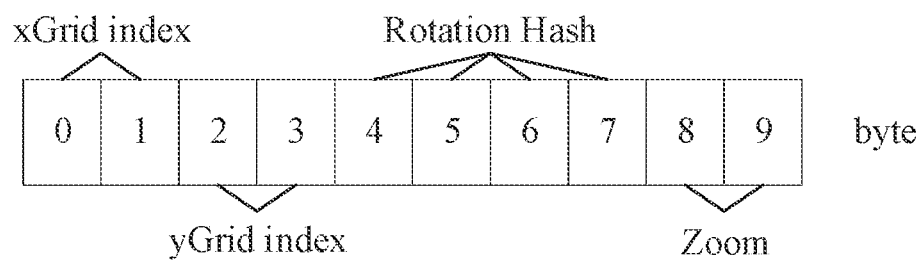
FIG. 12 is a schematic diagram of an information structure of an information code according to an exemplary embodiment of this application.

Schematically, as shown in FIG. 11 and FIG. 12, the geographic location information may be represented by two integers, such as a Grid origin (0,0). Each integer is encoded into a 16-bit index, such as an "xGrid index" and a "yGrid index". The foregoing rotation information combines three 16-bit integers (representing the Euler angle) into one 32-bit integer, such as a "rotation Hash". The size information may reduce the accuracy of three floating-point numbers to one 16-bit integer, such as "zoom". Each small cell in the figure represents 8 bits. The posture information may be transmitted through 10-byte information coding.

In some embodiments, after encoding the posture information to obtain the information code, the terminal may further process the information code. For example, the terminal encrypts the information code through Base64 (representing binary data based on 64 printable characters).

In some embodiments, a data type of the posture information is transform.

2) Copy and paste the information code into an information sharing channel.

In some embodiments, the terminal automatically copies and pastes the information code into the information sharing channel according to a sharing operation; or the user copies and pastes the information code into the information sharing channel.

In some embodiments, the information sharing channel may be an instant messaging program or a network platform.

3) Share the information code from the first account to the second account by using the information sharing channel.

The first account is logged in to the application of the terminal, and the information code is shared with the second account through the first account.

Schematically, the application of the terminal is an instant messaging program, the first account is logged in to the instant messaging program, the first account and the second account are social friends, and the terminal sends the information code to the second account through the first account.

Alternatively, the application of the terminal is a network platform, the first account is logged in to the network platform, the first account and the second account are strangers, the terminal publishes the information code on the network platform through the first account, and the second account can access the network platform to obtain the information code.

Figure 13:
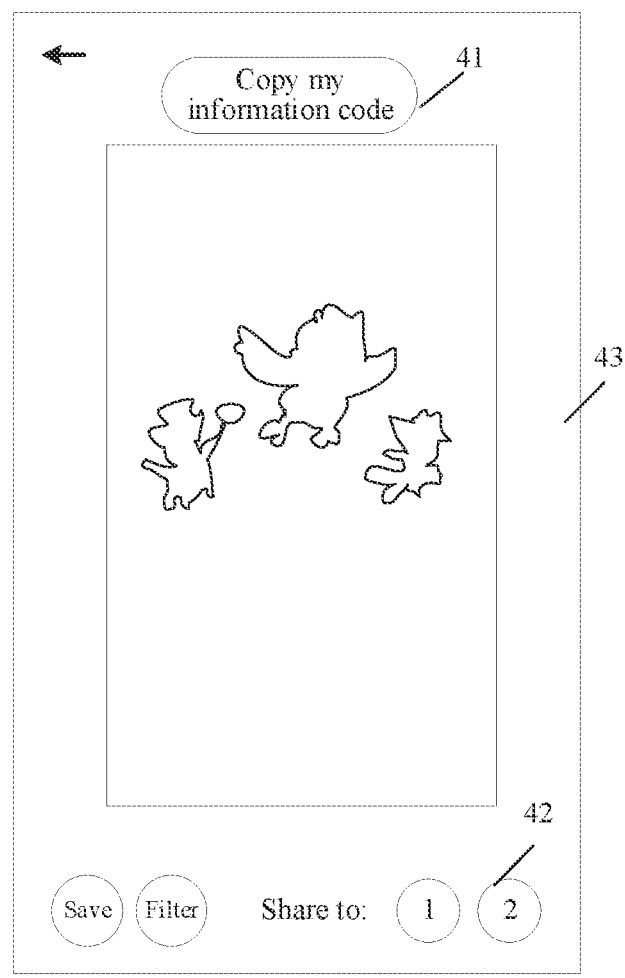
FIG. 13 is a schematic diagram of an interface for implementing a method for controlling a plurality of virtual characters according to another exemplary embodiment of this application.

As shown in FIG. 13, the third user interface 43 includes a share button control 41. The share button control 41 may be clicked to obtain the information code; and when the information code is successfully obtained, the terminal displays prompt information "The information code has been copied, go share it~". The third user interface further includes a share button control 42, and the share button control 42 is configured to share a AR picture.

Based on the above, according to the method for controlling a plurality of virtual characters provided in this embodiment, posture information of at least two virtual characters is shared by using an information code, so that users can share various photographing postures of virtual characters. In addition, the information code can be transmitted by using a very short character string, which reduces the difficulty of transmitting the posture information. For example, the information code in FIG. 12 only occupies 10 bytes.

Schematically, the terminal may set an action of a virtual character through a progress bar. For example, in FIG. 14, the terminal receives a trigger operation on a selection control 51 and displays an action selection item; receives a trigger operation on an action selection item 52, and plays an action corresponding to the action selection item 52, that is, a virtual character 54 performs the foregoing action; receives a drag operation on a progress bar 53 to select an action picture; and receives a freeze operation on the progress bar 53, to freeze the action of the virtual character 54, the freezing action being an action finally determined.

The action may include leisure, charging, standby, jumping, attacking, skill casting, falling to the ground, dizziness, and the like.

Figure 14:
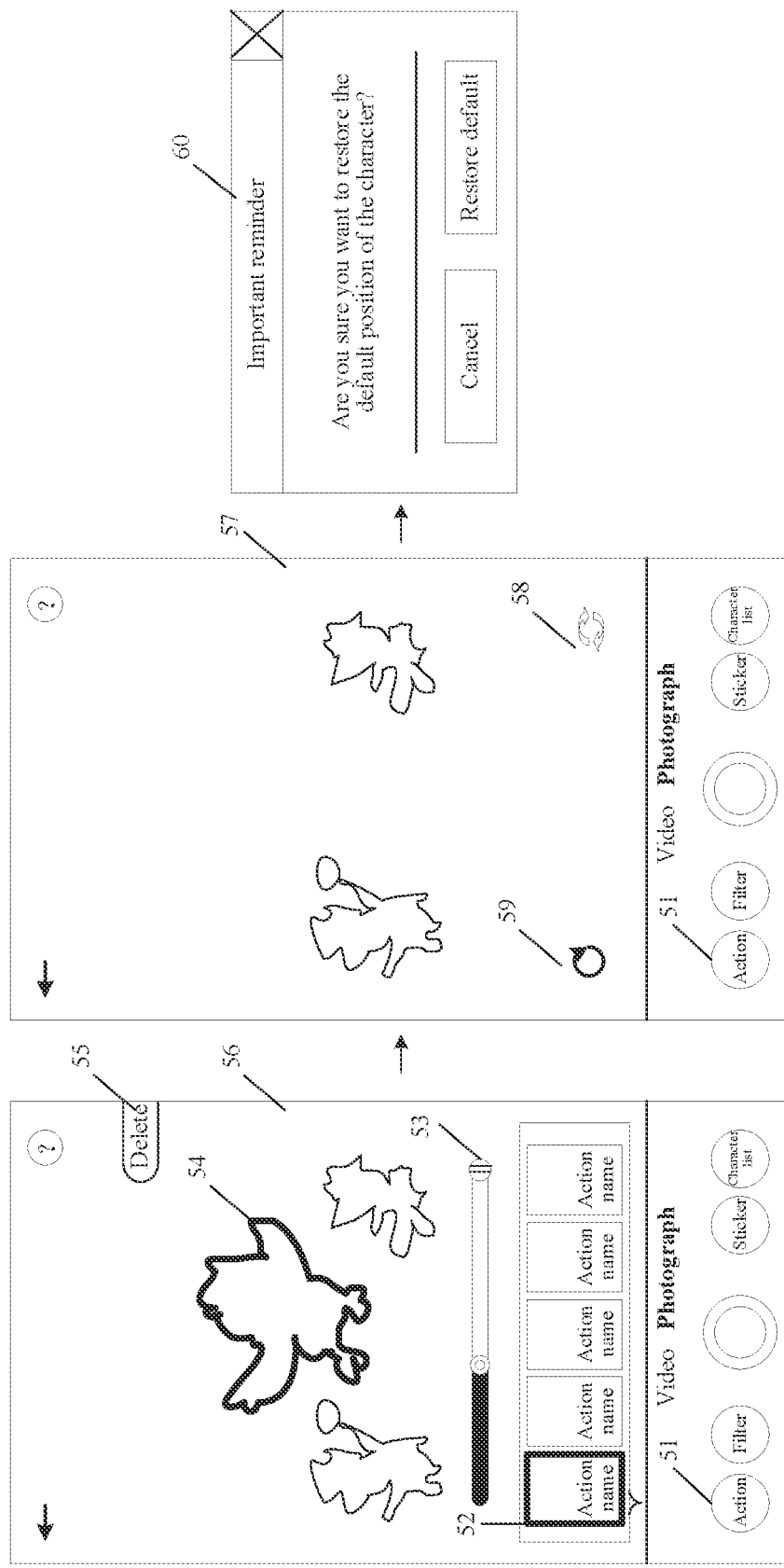
FIG. 14 is a schematic diagram of an interface for implementing a method for controlling a plurality of virtual characters according to another exemplary embodiment of this application.

The terminal may then delete the target virtual character. As shown in FIG. 14, when the terminal determines that the target virtual character is the virtual character 54, a delete button control 55 is displayed on a user interface 56. When the terminal receives a trigger operation on the delete button control 55, the virtual character 54 is deleted and a user interface 57 is displayed.

The terminal may then switch the camera between a front-facing camera and a rear-facing camera. As shown in FIG. 14, the user interface 57 includes a camera switch button 58.

After setting the posture information of the virtual characters, the terminal may further restore the posture information of the virtual characters to default posture information with one click. As shown in FIG. 14, the user interface 57 includes a restore control 59. The terminal receives a trigger operation of the restore control 59 and displays a card 60. The card 60 includes reminder information, and whether to restore is determined by a conforming or canceling operation.

Figure 15:
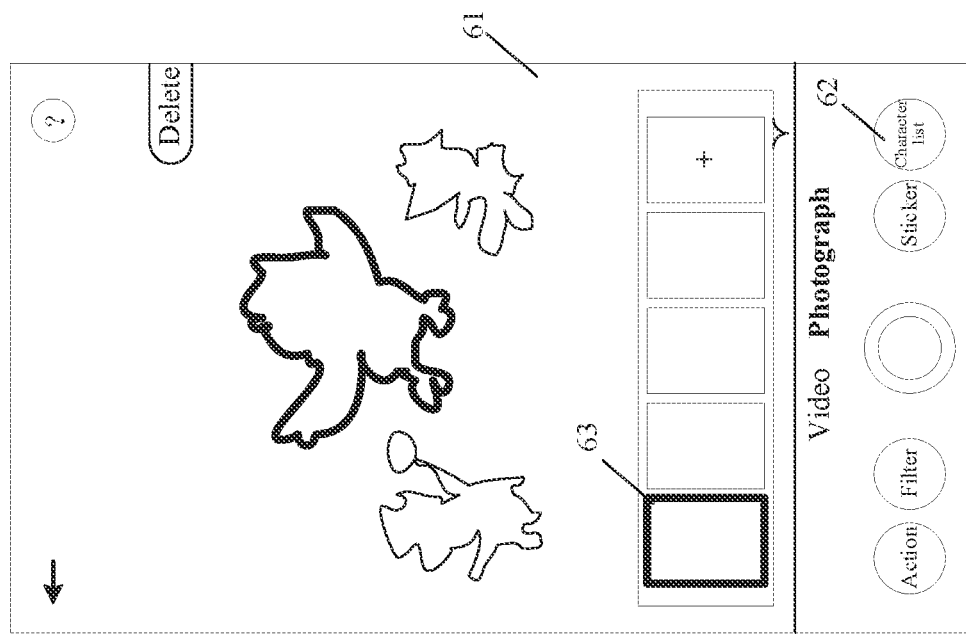
FIG. 15 is a schematic diagram of an interface for implementing a method for controlling a plurality of virtual characters according to another exemplary embodiment of this application.

Further, after displaying the second user interface, the terminal may add displayed virtual characters. As shown in FIG. 15, the user interface 61 includes a list control 62. The terminal receives a trigger operation on the list control 62 and displays a selection item 63 of a virtual character. The terminal may add and display a virtual character according to a selection operation.

Figure 16:
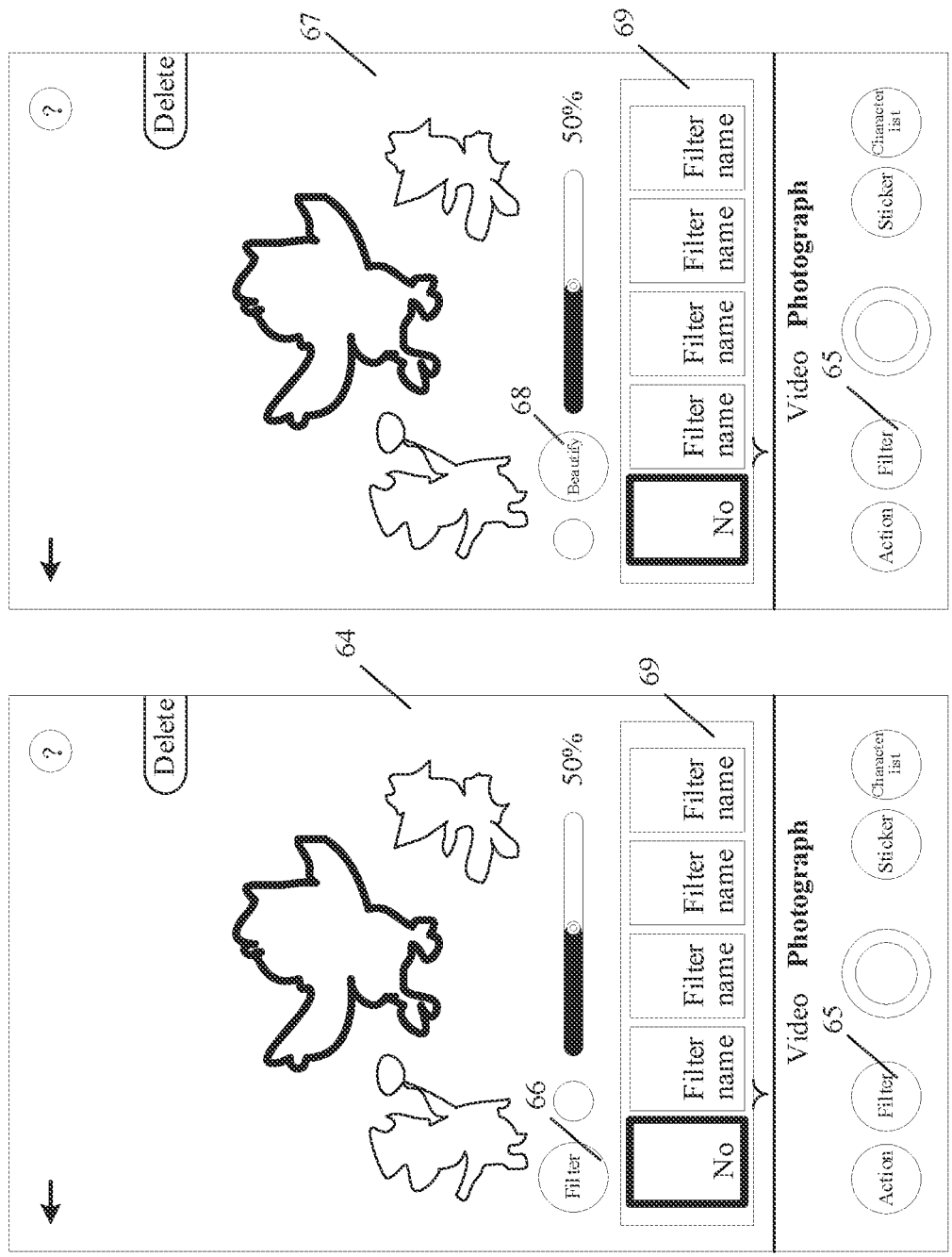
FIG. 16 is a schematic diagram of an interface for implementing a method for controlling a plurality of virtual characters according to another exemplary embodiment of this application.

The terminal may further add a filter or beautification to a virtual character. As shown in FIG. 16, a filter control 65 is displayed on a user interface 64. A trigger operation on the filter control 65 is received, and a filter list is displayed. When receiving a trigger operation on a filter control 66, the terminal displays a filter list corresponding to the filters. As shown on the user interface 67 in the figure, when receiving a trigger operation on a beautification control 68, the terminal displays a filter list corresponding to the beautification. The terminal further uses a progress bar to set a corresponding value of the filter, for example, adjust a percent of the beautification.

Figure 17:
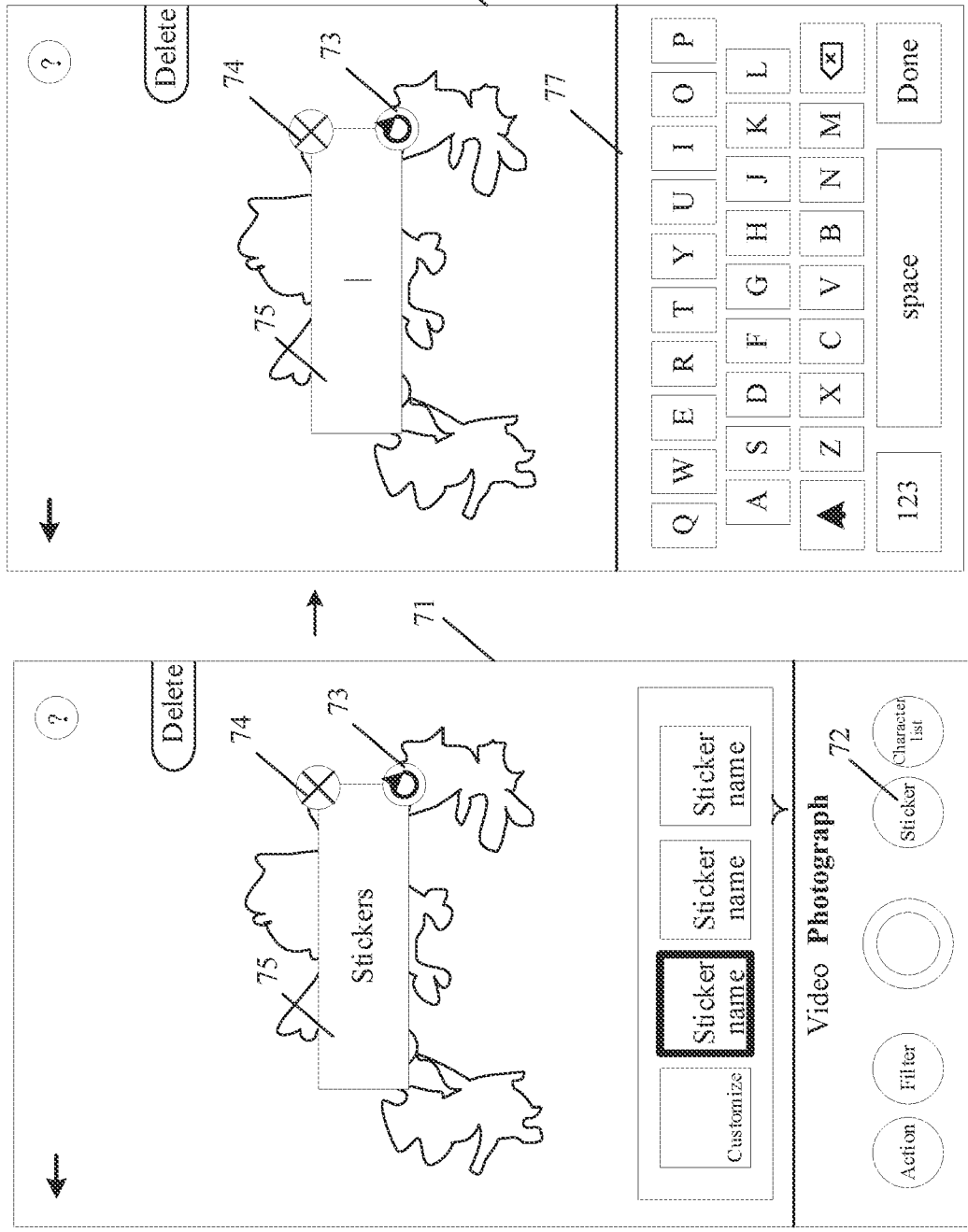
FIG. 17 is a schematic diagram of an interface for implementing a method for controlling a plurality of virtual characters according to another exemplary embodiment of this application.

The terminal may further add a sticker to the user interface during photographing. As shown in FIG. 17, a user interface 71 includes a sticker button control 72. The terminal receives a trigger operation on the sticker button control 72 and displays a sticker list. The terminal receives a selection operation on a template, and displays a template 75. The template 75 includes a close button 74. When receiving a trigger operation on the close button 74, the terminal cancels sticker addition. The template 75 includes a rotation button 73. When the terminal receives a drag operation on the rotation button 73, the terminal rotates the template 75 according to the drag operation. When receiving a trigger operation on a text control of the template 75, the terminal displays a user interface 76. The user interface 76 includes a keyboard 77 used for inputting text content in the template 75.

Figure 18:
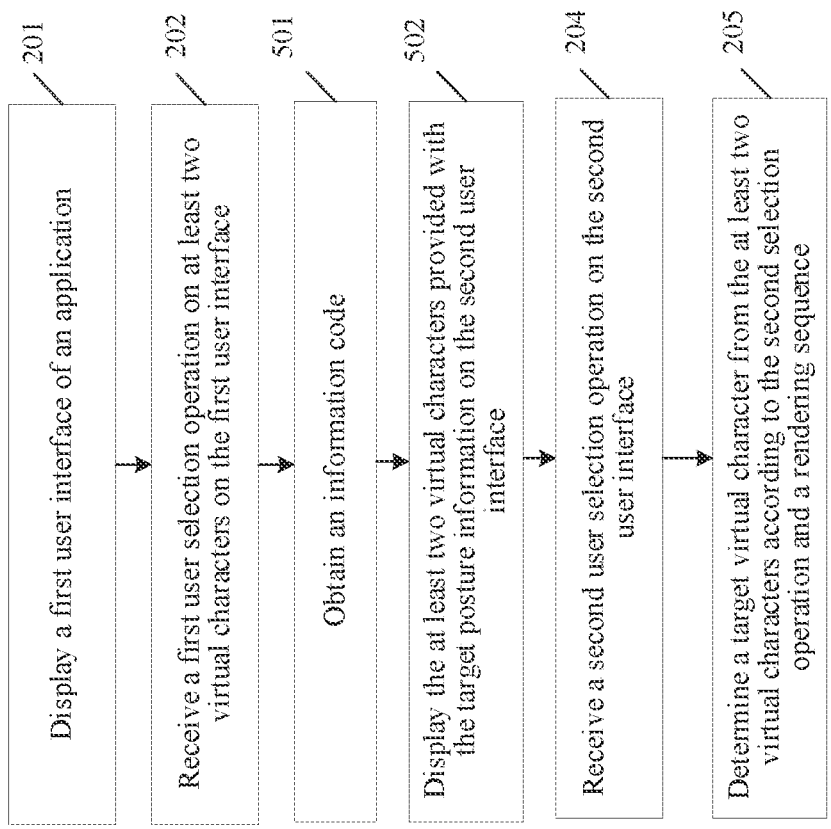
FIG. 18 is a flowchart of a method for controlling a plurality of virtual characters according to another exemplary embodiment of this application.

In some embodiments, the terminal may set the posture information of the virtual characters by using an information code. Schematically, based on FIG. 2, step 203 is replaced with steps 501 and 502. As shown in FIG. 18, the steps are as follows:

Step 501. Obtain an information code.

The information code is obtained by encoding target posture information, and the target posture information is used for setting postures of the at least two virtual characters.

In some embodiments, the terminal receives the information code shared from the second account to the first account by using the information sharing channel.

Step 502. Display the at least two virtual characters provided with the target posture information on the second user interface.

In some embodiments, the target posture information includes target depth information. The setting of the posture information of the at least two virtual characters includes the following schematic steps:

1) The terminal determines a first correspondence between the target depth information and the rendering sequence.

2) Determine a second correspondence between n pieces of the target posture information and n virtual characters according to the first correspondence.

3) Set an $i^{th}$ piece of target posture information as posture information of a $j^{th}$ virtual character according to the second correspondence.

4) Display the $j^{th}$ virtual character on the second user interface.

n, i, and j are positive integers, and i and j are both less than n.

Schematically, as shown in Table 1, the first correspondence and the second correspondence are included. When the target depth information a>b>c, a rendering sequence corresponding to the target posture information is 1, 2, and 3, the third piece of target posture information corresponds to the first virtual character, the second piece of target posture information corresponds to the second virtual character, and the first piece of target posture information corresponds to the third virtual character. The terminal sets the third piece of target posture information as posture information of the first virtual character, the second piece of target posture information as posture information of the second virtual character, and the first piece of target posture information as posture information of the third virtual character.

TABLE 1

| Virtual characters | Rendering sequence of virtual characters | Target depth information | Target posture information |
|---|---|---|---|
| 1 | 1 | a | 3 |
| 2 | 2 | b | 2 |
| 3 | 3 | c | 1 |

Figure 19:
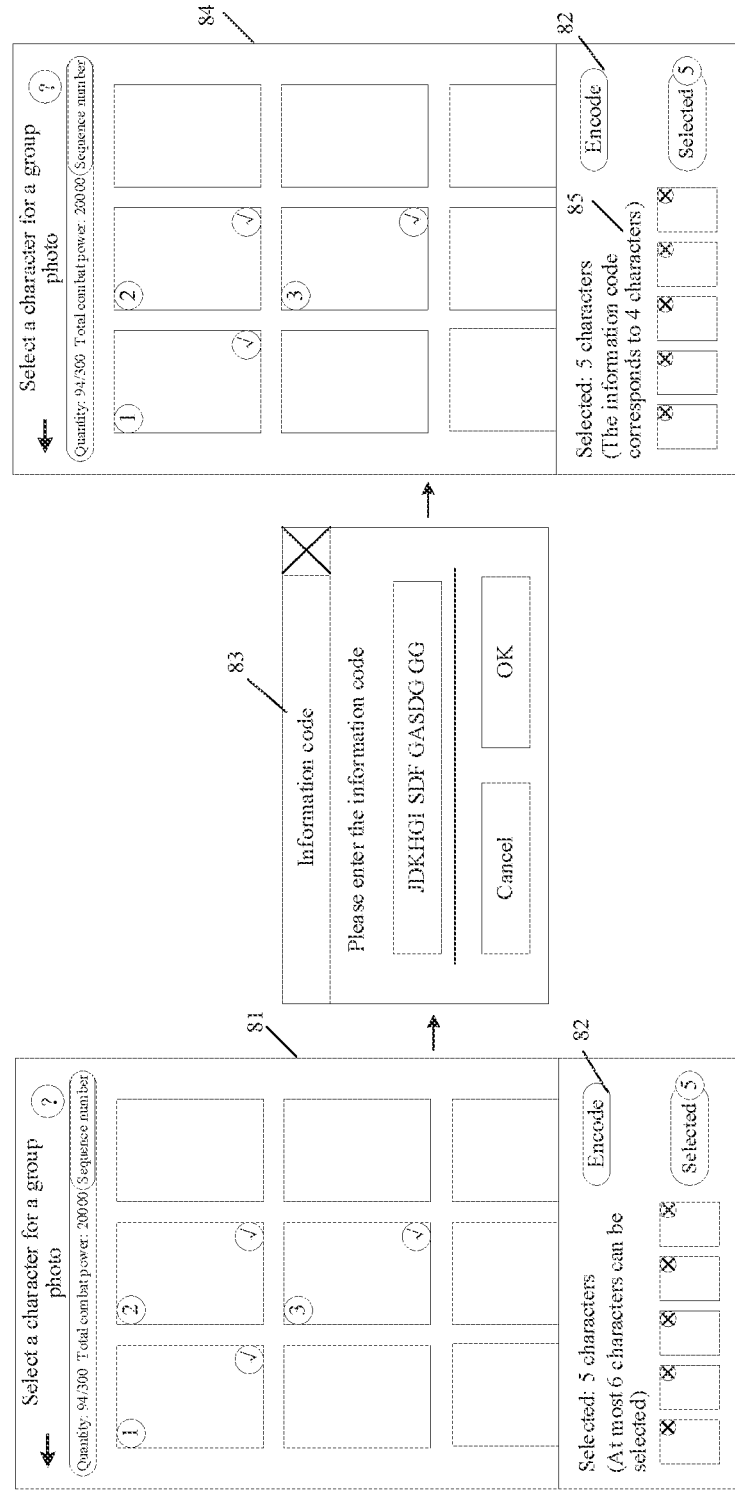
FIG. 19 is a schematic diagram of an interface for implementing a method for controlling a plurality of virtual characters according to another exemplary embodiment of this application.

Schematically, a method for obtaining the information code may be shown in FIG. 19. A first user interface 81 includes an encoding control 82. The terminal receives a trigger operation on the encoding control 82 and displays a card 83. The card 83 displays a code input control. The user may copy and paste the information code into the code input control, and click an OK button to set the posture information of the virtual characters. A user interface 84 is displayed, and the user interface 84 includes prompt information "the information code corresponds to 4 characters", to prompt the user of a quantity of virtual characters corresponding to the information code.

Based on the above, according to the method for controlling a plurality of virtual characters provided in this embodiment, posture information of at least two virtual characters is shared by using an information code, so that users can share various photographing postures of virtual characters. In addition, the information code can be transmitted by using a very short character string, which reduces the difficulty of transmitting the posture information.

Figure 20:
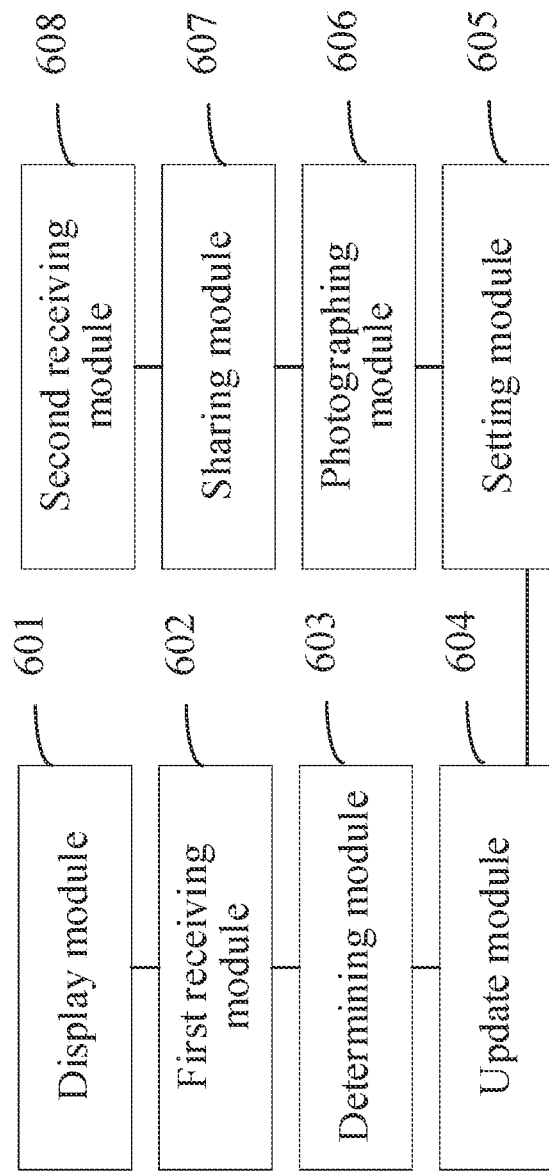
FIG. 20 is a block diagram of an apparatus for controlling a plurality of virtual characters according to an exemplary embodiment of this application.

FIG. 20 shows an apparatus for controlling a plurality of virtual characters according to an exemplary embodiment of this application. An application with an AR function runs in the apparatus. The apparatus includes:

a display module 601, configured to display a first user interface of the application, the first user interface including selection items of a plurality of virtual characters;

a first receiving module 602, configured to receive a first selection operation on at least two virtual characters on the first user interface;

the display module 601 being configured to display a second user interface of the application, a background picture of a real world and the at least two virtual characters located on the background picture being displayed on the second user interface, the at least two virtual characters being obtained through rendering after a rendering sequence of the at least two virtual characters is determined according to depth information, the depth information being set according to a sequence of the first selection operation;

the first receiving module 602 being configured to receive a second user selection operation on the second user interface; and a determining module 603, configured to determine a target virtual character from the at least two virtual characters according to the second user selection operation and the rendering sequence.

In some embodiments, the determining module 603 is configured to determine a virtual character to be rendered first in the rendering sequence as the target virtual character according to the second user selection operation when the at least two virtual characters overlap.

In some embodiments, the determining module 603 is configured to: emit a physical ray from a trigger position of the second user selection operation in a three-dimensional virtual environment in which the virtual character is located; and determine a virtual character that collides with the physical ray according to the rendering sequence as the target virtual character, the physical ray colliding with the virtual character to be rendered first in the rendering sequence.

In some embodiments, the apparatus further includes:

an update module 604, configured to: determine the target virtual character as the virtual character to be rendered first in the rendering sequence, and update the rendering sequence; and the display module 601 is configured to display the at least two virtual characters according to the updated rendering sequence.

In some embodiments, the second user interface includes a photographing control; and the apparatus further includes:

a first receiving module 602, configured to receive a posture setting operation triggered on the target virtual character;

a setting module 605, configured to set posture information of the target virtual character according to the posture setting operation;

the first receiving module 602 being configured to receive a photographing operation triggered on the photographing control; and a photographing module 606, configured to photograph the at least two virtual characters according to the photographing operation to obtain a AR picture, the AR picture including the target virtual character displayed with setting of the posture information.

In some embodiments, the apparatus further includes:
the display module 601 being configured to display a third user interface of the application, the third user interface including the AR picture and a share button control;
the first receiving module 602 being configured to receive a sharing operation on the share button control; and
the sharing module 607 being configured to share an information code from a first account to a second account according to the sharing operation, the information code including the posture information of the at least two virtual characters in the AR picture, the information code being used for setting postures of the at least two virtual characters.

In some embodiments, the sharing module 607 is configured to obtain the posture information of the at least two virtual characters according to the sharing operation, to generate the information code; copy and paste the information code into an information sharing channel; and share the information code from the first account to the second account by using the information sharing channel.

In some embodiments, the display module 601 is configured to: obtain an information code, the information code being obtained by encoding target posture information, the target posture information being used for setting postures of the at least two virtual characters; and display the at least two virtual characters provided with the target posture information on the second user interface.

In some embodiments, the target posture information includes target depth information; and
the display module 601 is configured to: determine a first correspondence between the target depth information and the rendering sequence; determine a second correspondence between n pieces of the target posture information and n virtual characters according to the first correspondence; set an $i^{th}$ piece of target posture information as posture information of a $j^{th}$ virtual character according to the second correspondence; and display the $j^{th}$ virtual character on the second user interface, n, i, and j being positive integers, i and j being less than n.

In some embodiments, the apparatus further includes:
the second receiving module 608, configured to receive the information code shared from the second account to the first account by using the information sharing channel.

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. According to the apparatus for controlling a plurality of virtual characters provided in this embodiment, a rendering sequence is determined by using depth information, and at least two virtual characters are drawn according to the rendering sequence, so that a clipping phenomenon can be avoided when the virtual characters are superimposed, to enable a user to accurately determine a target virtual character when performing a selection operation on the virtual characters. The user can perform a control operation on a three-dimensional model like a two-dimensional picture in an AR scenario, to ensure consistency between touch determination and vision, thereby resolving a problem of human-computer interaction for a three-dimensional virtual character. For example, when a first virtual character overlaps with a second virtual character, and the first virtual character precedes the second virtual character in a rendering sequence, the terminal can accurately determine the first virtual character as the target virtual character according to a selection operation.

Figure 21:
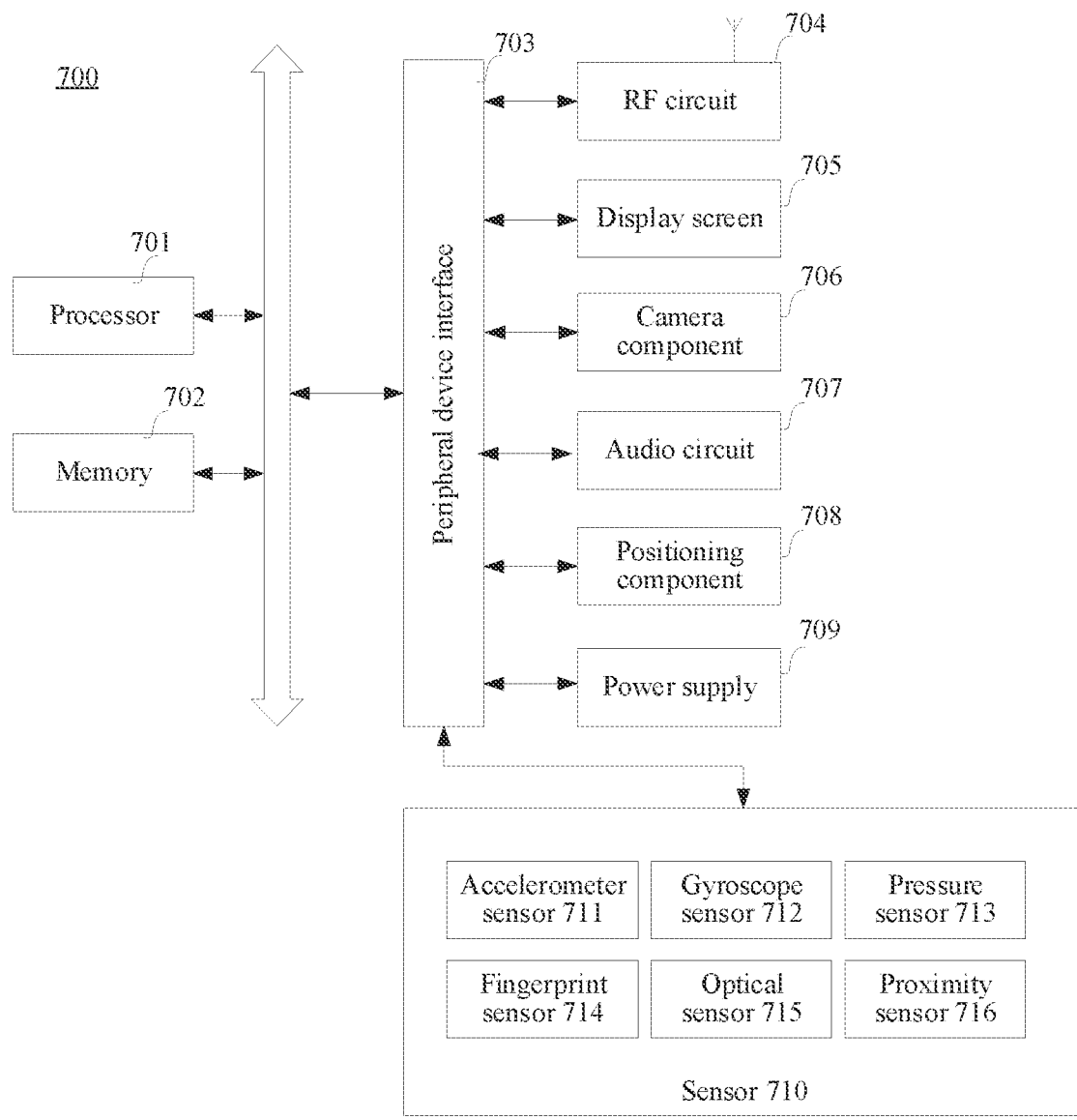
FIG. 21 is a block diagram of a terminal according to an exemplary embodiment of this application.

FIG. 21 is a structural block diagram of a terminal 700 according to an exemplary embodiment of this application. The terminal 700 may be a smartphone, a tablet computer, an MP3 player, an MP4 player, a notebook computer, or a desktop computer. The terminal 700 may also be referred to as user equipment, a portable terminal, a laptop terminal, or a desktop terminal, among other names.

Generally, the terminal 700 includes a processor 701 and a memory 702.

The processor 701 may include one or more processing cores, for example, a 4-core processor or an 8-core processor. The processor 701 may be implemented in at least one hardware form of digital signal processor (DSP), a field-programmable gate array (FPGA), and a programmable logic array (PLA). The processor 701 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 701 may be integrated with a graphics processing unit (GPU). The GPU is configured to render and draw content that needs to be displayed on a display screen. In some embodiments, the processor 701 may further include an artificial intelligence (AI) processor. The AI processor is configured to process computing operations related to machine learning.

The memory 702 may include one or more computer-readable storage media. The computer-readable storage medium may be non-transient. The memory 702 may further include a high-speed random access memory (RAM) and a nonvolatile memory, for example, one or more disk storage devices or flash storage devices. In some embodiments, the non-transient computer-readable storage medium in the memory 702 is configured to store at least one instruction. The at least one instruction is executed by the processor 701 to perform the method for controlling a plurality of virtual characters provided in the method embodiment in this application.

In some embodiments, the terminal 700 may alternatively include a peripheral device interface 703 and at least one peripheral device. The processor 701, the memory 702, and the peripheral device interface 703 may be connected by a bus or a signal line. Each peripheral device may be connected to the peripheral device interface 703 by using a bus, a signal cable, or a circuit board. Specifically, the peripheral device includes at least one of a radio frequency (RF) circuit 704, a touch display screen 705, a camera 706, an audio circuit 707, a positioning component 708, and a power supply 709.

The peripheral interface 703 may be configured to connect the at least one peripheral related to input/output (I/O) to the processor 701 and the memory 702. In some embodiments, the processor 701, the memory 702 and the peripheral device interface 703 are integrated on a same chip or circuit board. In some other embodiments, any one or two of the processor 701, the memory 702, and the peripheral device interface 703 may be implemented on a single chip or circuit board. This is not limited in this embodiment.

The RF circuit 704 is configured to receive and transmit an RF signal, which is also referred to as an electromagnetic signal. The RF circuit 704 communicates with a communication network and other communication devices through the electromagnetic signal. The RF circuit 704 converts an electrical signal into an electromagnetic signal for transmission, or converts a received electromagnetic signal into an electrical signal. In some embodiments, the RF circuit 704 includes an antenna system, an RF transceiver, one or more amplifiers, a tuner, an oscillator, a digital signal processor, a codec chip set, a subscriber identity module card, and the like. The RF circuit 704 may communicate with another terminal by using at least one wireless communication protocol. The wireless communication protocol includes, but is not limited to: a world wide web, a metropolitan area network, an intranet, generations of mobile communication networks (2G, 3G, 4G, and 5G), a wireless local area network, and/or a Wi-Fi network. In some embodiments, the RF 704 may further include a circuit related to NFC, which is not limited in this application.

The display screen 705 is configured to display a user interface (UI). The UI may include a graph, a text, an icon, a video, and any combination thereof. When the display screen 705 is a touch display screen, the display screen 705 is also capable of capturing a touch signal on or above a surface of the display screen 705. The touch signal may be inputted to the processor 701 as a control signal for processing. In this case, the display screen 705 may be further configured to provide a virtual button and/or a virtual keyboard that are/is also referred to as a soft button and/or a soft keyboard. In some embodiments, there may be one display screen 705, disposed on a front panel of the terminal 700. In some other embodiments, there may be at least two display screens 705, respectively disposed on different surfaces of the terminal 700 or designed in a folded shape. In still some other embodiments, the display screen 705 may be a flexible display screen, disposed on a curved surface or a folded surface of the terminal 700. Even, the display screen 705 may be further set in a non-rectangular irregular pattern, namely, a special-shaped screen. The display screen 705 may be prepared by using materials such as a liquid crystal display (LCD), an organic light-emitting diode (OLED), or the like.

The camera component 706 is configured to capture images or videos. In some embodiments, the camera component 706 includes a front-facing camera and a rear-facing camera. Generally, the front-facing camera is disposed on the front panel of the terminal, and the rear-facing camera is disposed on a back surface of the terminal. In some embodiments, there are at least two rear cameras, which are respectively any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions. In some embodiments, the camera component 706 may further include a flash. The flash may be a monochrome temperature flash, or may be a double color temperature flash. The double color temperature flash refers to a combination of a warm light flash and a cold light flash, and may be used for light compensation under different color temperatures.

The audio circuit 707 may include a microphone and a speaker. The microphone is configured to acquire sound waves of a user and an environment, and convert the sound waves into an electrical signal to input to the processor 701 for processing, or input to the RF circuit 704 for implementing voice communication. For the purpose of stereo acquisition or noise reduction, there may be a plurality of microphones, respectively disposed at different portions of the terminal 700. The microphone may be further an array microphone or an omni-directional acquisition type microphone. The speaker is configured to convert electrical signals from the processor 701 or the RF circuit 704 into sound waves. The speaker may be a conventional film speaker, or may be a piezoelectric ceramic speaker. When the speaker is the piezoelectric ceramic speaker, the speaker not only can convert an electric signal into acoustic waves audible to a human being, but also can convert an electric signal into acoustic waves inaudible to a human being, for ranging and other purposes. In some embodiments, the audio circuit 707 may also include an earphone jack.

The positioning assembly 708 is configured to position a current geographic location of the terminal 700, to implement a navigation or a location based service (LBS). The positioning component 708 may be a positioning component based on the global positioning system (GPS) of the United States, the BeiDou System of China, and the GALILEO System of Russia.

The power supply 709 is configured to supply power to components in the terminal 700. The power supply 709 may be an alternating current, a direct current, a primary battery, or a rechargeable battery. When the power supply 709 includes a rechargeable battery, and the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charging technology.

In some embodiments, the terminal 700 further includes one or more sensors 710. The one or more sensors 710 include, but are not limited to: an acceleration sensor 711, a gyroscope sensor 712, a pressure sensor 713, a fingerprint sensor 714, an optical sensor 715, and a proximity sensor 716.

The acceleration sensor 711 may detect a magnitude of acceleration on three coordinate axes of a coordinate system established with the terminal 700. For example, the acceleration sensor 711 may be configured to detect components of gravity acceleration on the three coordinate axes. The processor 701 may control, according to a gravity acceleration signal acquired by the acceleration sensor 711, the display screen 705 to display the user interface in a frame view or a portrait view. The acceleration sensor 711 may be further configured to acquire motion data of a game or a user.

The gyroscope sensor 712 may detect a body direction and a rotation angle of the terminal 700. The gyroscope sensor 712 may cooperate with the acceleration sensor 711 to acquire a 3D action by the user on the terminal 700. The processor 701 may implement the following functions according to the data acquired by the gyroscope sensor 712: motion sensing (such as changing the UI according to a tilt operation of the user), image stabilization at shooting, game control, and inertial navigation.

The pressure sensor 713 may be disposed at a side frame of the terminal 700 and/or a lower layer of the display screen 705. When the pressure sensor 713 is disposed at the side frame of the terminal 700, a holding signal of the user on the terminal 700 may be detected. The processor 701 performs left/right hand recognition or a quick operation according to the holding signal acquired by the pressure sensor 713. When the pressure sensor 713 is disposed on the low layer of the touch display screen 705, the processor 701 controls, according to a pressure operation of the user on the touch display screen 705, an operable control on the UI. The operable control includes at least one of a button control, a scroll-bar control, an icon control, and a menu control.

The fingerprint sensor 714 is configured to acquire a user's fingerprint, and the processor 701 identifies a user's identity according to the fingerprint acquired by the fingerprint sensor 714, or the fingerprint sensor 714 identifies a user's identity according to the acquired fingerprint. When identifying that the user's identity is a trusted identity, the processor 701 authorizes the user to perform related sensitive operations. The sensitive operations include: unlocking a screen, viewing encrypted information, downloading software, paying, changing a setting, and the like. The fingerprint sensor 714 may be disposed on a front surface, a back surface, or a side surface of the terminal 700. When a physical button or a vendor logo is disposed on the terminal 700, the fingerprint 714 may be integrated with the physical button or the vendor logo.

The optical sensor 715 is configured to acquire ambient light intensity. In an embodiment, the processor 701 may control the display brightness of the touch display screen 705 according to the ambient light intensity acquired by the optical sensor 715. Specifically, when the ambient light intensity is relatively high, the display brightness of the touch display screen 705 is increased. When the ambient light intensity is relatively low, the display brightness of the touch display screen 705 is decreased. In another embodiment, the processor 701 may further dynamically adjust a camera parameter of the camera component 706 according to the ambient light intensity acquired by the optical sensor 715.

The proximity sensor 716, also referred to as a distance sensor, is generally disposed on the front panel of the terminal 700. The proximity sensor 716 is configured to acquire a distance between the user and the front surface of the terminal 700. In an embodiment, when the proximity sensor 716 detects that a distance between the user and the front face of the terminal 700 gradually becomes smaller, the touch display screen 705 is controlled by the processor 701 to switch from a screen-on state to a screen-off state. When the proximity sensor 716 detects that the distance between the user and the front face of the terminal 700 gradually becomes larger, the touch display screen 705 is controlled by the processor 701 to switch from the screen-off state to the screen-on state.

A person skilled in the art may understand that a structure shown in FIG. 21 constitutes no limitation on the terminal 700, and the terminal may include more or fewer components than those shown in the figure, or some components may be combined, or a different component deployment may be used.

This application further provides a computer-readable storage medium, storing at least one instruction, at least one program, a code set, or an instruction set, the at least one instruction, the at least one program, the code set, or the instruction set being loaded and executed by a processor to implement the method for controlling a plurality of virtual characters provided in the foregoing method embodiments.

Figure 22:
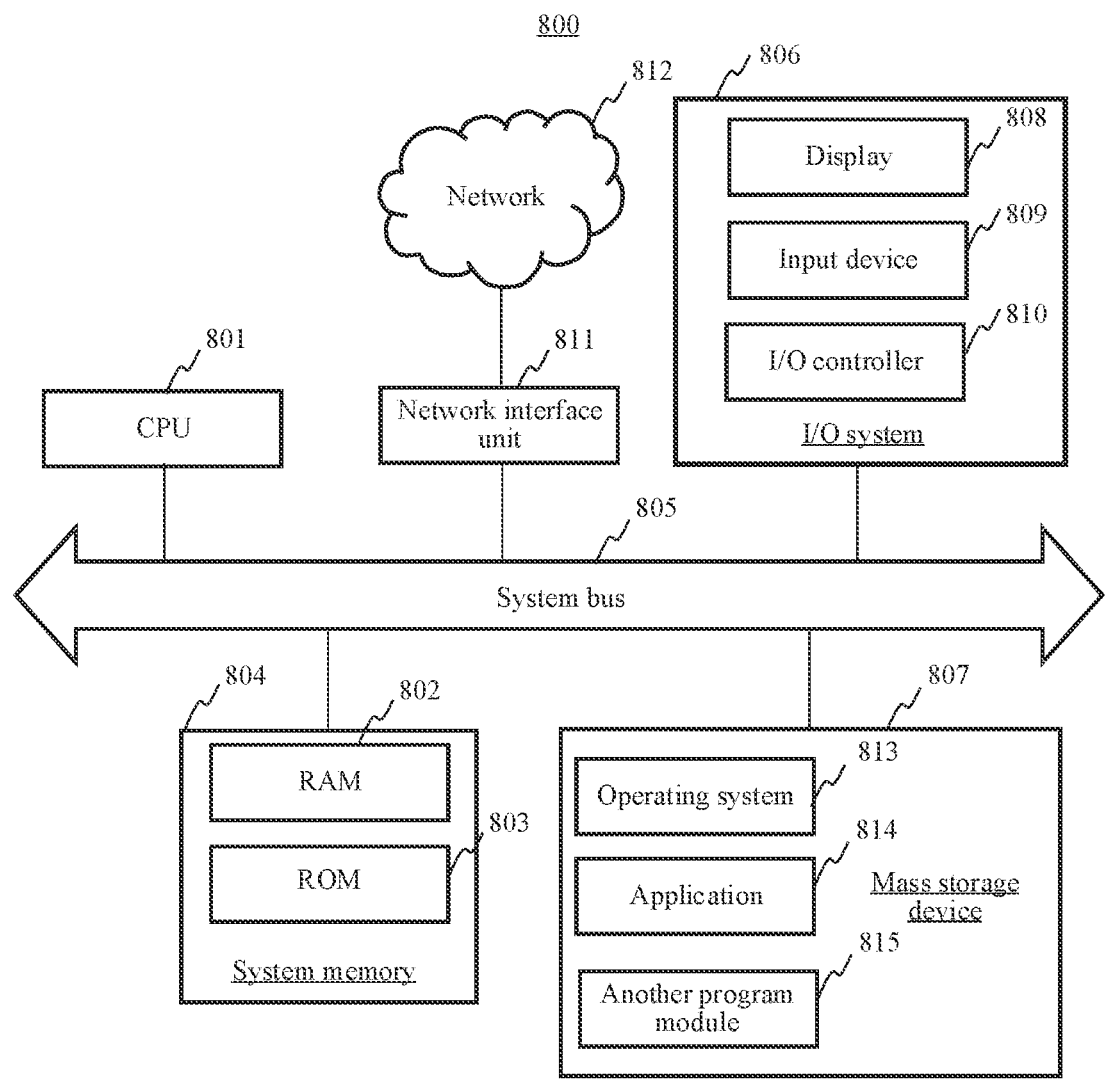
FIG. 22 is a block diagram of a server according to an exemplary embodiment of this application.

FIG. 22 is a schematic structural diagram of a server according to an embodiment of this application. Specifically, a server 800 includes a CPU 801, a system memory 804 including a RAM 802 and a read-only memory (ROM) 803, and a system bus 805 connecting the system memory 804 and the CPU 801. The server 800 further includes a basic I/O system 806 helping transmit information between components in a computer, and a mass storage device 807 used for storing an operating system 813, an application program 814, and another program module 815.

The basic I/O system 806 includes a display 808 used for displaying information, and an input device 809, such as a mouse and a keyboard, used for a user to input information. The display 808 and the input device 809 are connected to an I/O controller 810 of the system bus 805, to be connected to the CPU 801. The basic I/O system 806 may further include the I/O controller 810, to receive and process inputs from a plurality of other devices, such as the keyboard, the mouse, or an electronic stylus. Similarly, the I/O controller 810 further provides an output to a display screen, a printer, or another type of output device.

The mass storage device 807 is connected to a mass storage controller (not shown) of the system bus 805, to be connected to the CPU 801. The mass storage device 807 and an associated computer readable medium provide non-volatile storage for the server 800. That is, the mass storage device 807 may include a computer-readable medium (not shown) such as a hard disk or a compact disc ROM (CD-ROM) drive.

Without loss of generality, the computer-readable medium may include a computer storage medium and a communication medium. The computer storage medium includes volatile and non-volatile media, and removable and non-removable media implemented by using any method or technology used for storing information such as computer-readable instructions, data structures, program modules, or other data. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, a person skilled in the art may learn that the computer storage medium is not limited to the foregoing several types. The system memory 804 and the mass storage device 807 may be collectively referred to as a memory.

According to the embodiments of this application, the server 800 may further be connected to a remote computer on a network through a network, such as Internet. That is, the server 800 may be connected to a network 812 by being connected to a network interface unit 811 on the system bus 805, or, may be connected to a network of another type or a remote computer system (not shown) by using the network interface unit 811.

This application further provides a computer program product, the computer program product, when run on an electronic device, causing the electronic device to perform the method for controlling a plurality of virtual characters in the foregoing method embodiments.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely preferred embodiments of this application, and are not intended to limit this application. Any modification, equivalent replacement, improvement and the like made within the spirit and principle of this application shall fall within the protection scope of this application.

What is claimed is:

1. A method for controlling a plurality of virtual characters in an application with an augmented reality (AR) function performed by a computer device, the method comprising:
displaying a first user interface of the application associated with a first account, the first user interface including a plurality of virtual characters;
receiving a first user selection operation of at least two of the plurality of virtual characters on the first user interface, wherein the first user selection operation defines unique depth information for each of the at least two user-selected virtual characters in the selection order;
displaying a second user interface of the application, the second user interface of the application including the at least two user-selected virtual characters located in a real-world background picture, the at least two virtual characters being rendered in the real-world background picture according to the depth information of the at least two virtual characters from near to far based on the selection order of the at least two virtual characters by the first user selection operation;
receiving a second user selection operation on the second user interface, wherein the second user selection operation is located in an overlapped area between the at least two virtual characters;
determining, among the at least two virtual characters, a virtual character to be rendered first according to its depth information as a target virtual character according to the second user selection operation located at the overlapped area between the at least two virtual characters;
encoding target posture information of the at least two virtual characters into an information code; and
sharing the information code from the first account to a second account of the application, wherein the second account is configured to extract the target posture information of the at least two virtual characters from an information code and construct an AR picture comprising the at least two virtual characters according to the target posture information.

2. The method according to claim 1, wherein the determining, among the at least two virtual characters, a virtual character to be rendered first in the rendering sequence as the target virtual character according to the second user selection operation comprises:
emitting a physical ray from a trigger position of the second user selection operation in a three-dimensional virtual environment in which the virtual character is located; and
determining, among the at least two virtual characters, a virtual character that first collides with the physical ray according to the rendering sequence as the target virtual character.

3. The method according to claim 1, wherein the method further comprises:
updating the first rendering sequence by setting the target virtual character to be the virtual character to be rendered first; and
displaying the at least two virtual characters according to the updated first rendering sequence.

4. The method according to claim 1, wherein the second user interface comprises a photographing control.

5. The method according to claim 4, wherein the method further comprises:
receiving a posture setting operation triggered on the target virtual character;
updating posture information of the target virtual character in the picture according to the posture setting operation;
receiving a photographing operation triggered on the photographing control; and
photographing the at least two virtual characters according to the photographing operation to obtain an AR picture, the AR picture comprising the target virtual character displayed with the updated posture information of the target virtual character in the picture.

6. The method according to claim 1, wherein the displaying a second user interface of the application comprises:
displaying an AR picture comprising the at least two virtual characters in the real-world background picture according to the target posture information on the second user interface.

7. A computer device, comprising:
a processor;
memory; and
a plurality of computer-executable instructions stored in the memory that, when executed by the processor, cause the computer device to perform a method for controlling a plurality of virtual characters in an application with an augmented reality (AR) function, the method including:
displaying a first user interface of the application associated with a first account, the first user interface including a plurality of virtual characters;
receiving a first user selection operation of at least two of the plurality of virtual characters on the first user interface, wherein the first user selection operation defines unique depth information for each of the at least two user-selected virtual characters in the selection order;
displaying a second user interface of the application, the second user interface of the application including the at least two user-selected virtual characters located in a real-world background picture, the at least two virtual characters being rendered in the real-world background picture according to the depth information of the at least two virtual characters from near to far based on the selection order of the at least two virtual characters by the first user selection operation;
receiving a second user selection operation on the second user interface, wherein the second user selection operation is located in an overlapped area between the at least two virtual characters;
determining, among the at least two virtual characters, a virtual character to be rendered first according to its depth information as a target virtual character according to the second user selection operation located at the overlapped area between the at least two virtual characters;
encoding target posture information of the at least two virtual characters into an information code; and
sharing the information code from the first account to a second account of the application, wherein the second account is configured to extract the target posture information of the at least two virtual characters from an information code and construct an AR picture comprising the at least two virtual characters according to the target posture information.

8. The computer device according to claim 7, wherein the determining, among the at least two virtual characters, a virtual character to be rendered first in the rendering sequence as the target virtual character according to the second user selection operation comprises:
  emitting a physical ray from a trigger position of the second user selection operation in a three-dimensional virtual environment in which the virtual character is located; and
  determining, among the at least two virtual characters, a virtual character that first collides with the physical ray according to the rendering sequence as the target virtual character.

9. The computer device according to claim 7, wherein the method further comprises:
  updating the first rendering sequence by setting the target virtual character to be the virtual character to be rendered first; and
  displaying the at least two virtual characters according to the updated first rendering sequence.

10. The computer device according to claim 7, wherein the second user interface comprises a photographing control.

11. The computer device according to claim 10, wherein the method further comprises:
  receiving a posture setting operation triggered on the target virtual character;
  updating posture information of the target virtual character in the picture according to the posture setting operation;
  receiving a photographing operation triggered on the photographing control; and
  photographing the at least two virtual characters according to the photographing operation to obtain an AR picture, the AR picture comprising the target virtual character displayed with the updated posture information of the target virtual character in the picture.

12. The computer device according to claim 7, wherein the displaying a second user interface of the application comprises:
  displaying an AR picture comprising the at least two virtual characters in the real-world background picture according to the target posture information on the second user interface.

13. A non-transitory computer-readable storage medium, storing computer-executable instructions of an application with an augmented reality (AR) function, the computer-executable instructions being loaded and executed by a processor of a computer device to perform a method for controlling a plurality of virtual characters including:
  displaying a first user interface of the application associated with a first account, the first user interface including a plurality of virtual characters;
  receiving a first user selection operation of at least two of the plurality of virtual characters on the first user interface, wherein the first user selection operation defines unique depth information for each of the at least two user-selected virtual characters in the selection order;
  displaying a second user interface of the application, the second user interface of the application including the at least two user-selected virtual characters located in a real-world background picture, the at least two virtual characters being rendered in the real-world background picture according to the depth information of the at least two virtual characters from near to far based on the selection order of the at least two virtual characters by the first user selection operation;
  receiving a second user selection operation on the second user interface, wherein the second user selection operation is located in an overlapped area between the at least two virtual characters;
  determining, among the at least two virtual characters, a virtual character to be rendered first according to its depth information as a target virtual character according to the second user selection operation located at the overlapped area between the at least two virtual characters;
  encoding target posture information of the at least two virtual characters into an information code; and
  sharing the information code from the first account to a second account of the application, wherein the second account is configured to extract the target posture information of the at least two virtual characters from an information code and construct an AR picture comprising the at least two virtual characters according to the target posture information.

14. The non-transitory computer-readable storage medium according to claim 13, wherein the determining, among the at least two virtual characters, a virtual character to be rendered first in the rendering sequence as the target virtual character according to the second user selection operation comprises:
  emitting a physical ray from a trigger position of the second user selection operation in a three-dimensional virtual environment in which the virtual character is located; and
  determining, among the at least two virtual characters, a virtual character that first collides with the physical ray according to the rendering sequence as the target virtual character.

15. The non-transitory computer-readable storage medium according to claim 13, wherein the method further comprises:
  updating the first rendering sequence by setting the target virtual character to be the virtual character to be rendered first; and
  displaying the at least two virtual characters according to the updated first rendering sequence.

16. The non-transitory computer-readable storage medium according to claim 13, wherein the second user interface comprises a photographing control.

17. The non-transitory computer-readable storage medium according to claim 16, wherein the method further comprises:
  receiving a posture setting operation triggered on the target virtual character;
  updating posture information of the target virtual character in the picture according to the posture setting operation;
  receiving a photographing operation triggered on the photographing control; and
  photographing the at least two virtual characters according to the photographing operation to obtain an AR picture, the AR picture comprising the target virtual character displayed with the updated posture information of the target virtual character in the picture.

* * * * *